(12) United States Patent
Ieda et al.

(10) Patent No.: US 8,387,477 B2
(45) Date of Patent: Mar. 5, 2013

(54) GEAR SHIFT DEVICE

(75) Inventors: Yoshihisa Ieda, Saitama (JP); Akihiko Tomoda, Saitama (JP); Osamu Emizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 573 days.

(21) Appl. No.: 12/710,575

(22) Filed: Feb. 23, 2010

(65) Prior Publication Data

US 2010/0242655 A1 Sep. 30, 2010

(30) Foreign Application Priority Data

| Mar. 31, 2009 | (JP) | 2009-087980 |
| Mar. 31, 2009 | (JP) | 2009-087981 |
| Mar. 31, 2009 | (JP) | 2009-087982 |
| Mar. 31, 2009 | (JP) | 2009-087983 |
| Jul. 10, 2009 | (JP) | 2009-163740 |

(51) Int. Cl.
 *F16H 59/00* (2006.01)
 *F16H 61/00* (2006.01)
 *F16H 63/00* (2006.01)

(52) U.S. Cl. ............... 74/335; 74/473.16; 74/473.26

(58) Field of Classification Search .......... 74/473.1, 74/473.16, 473.26, 473.25, 473.36, 473.37, 74/335

See application file for complete search history.

(56) References Cited

U.S. PATENT DOCUMENTS

| 5,199,325 A * | 4/1993 | Reuter et al. ............... 74/335 |
| 6,658,960 B2 * | 12/2003 | Babin et al. ............... 74/473.28 |
| 6,843,149 B2 * | 1/2005 | Gavillucci ................ 74/473.21 |
| 6,880,420 B2 * | 4/2005 | Shen ............................ 74/335 |
| 7,387,042 B2 * | 6/2008 | Suzuki et al. .................. 74/335 |
| 7,707,904 B2 * | 5/2010 | Kimura et al. ................. 74/335 |
| 7,721,615 B2 * | 5/2010 | Ehrlich et al. ................. 74/335 |
| 7,886,627 B2 * | 2/2011 | Martin .......................... 74/335 |
| 7,966,902 B2 * | 6/2011 | Sotani et al. .................. 74/335 |
| 8,051,733 B2 * | 11/2011 | Mizuno et al. ................ 74/335 |
| 8,150,587 B2 * | 4/2012 | Tomoda et al. ................ 701/64 |
| 8,229,637 B2 * | 7/2012 | Kobayashi et al. ............ 701/66 |
| 8,245,588 B2 * | 8/2012 | Ogasawara et al. ............ 74/335 |
| 8,250,939 B2 * | 8/2012 | Hayakawa et al. ............ 74/335 |
| 2006/0065068 A1 * | 3/2006 | Mizuno et al. ............... 74/473.1 |
| 2007/0272045 A1 * | 11/2007 | Kosugi et al. .................. 74/335 |
| 2008/0178695 A1 * | 7/2008 | Fujimoto et al. .............. 74/335 |
| 2008/0264190 A1 * | 10/2008 | Nishimura ..................... 74/335 |
| 2009/0165583 A1 * | 7/2009 | Ogasawara et al. ............ 74/335 |
| 2009/0266192 A1 * | 10/2009 | Shiozaki et al. ............ 74/337.5 |

FOREIGN PATENT DOCUMENTS

JP 2008-221410 A 8/2008

\* cited by examiner

*Primary Examiner* — Troy Chambers
*Assistant Examiner* — Gregory Prather
(74) *Attorney, Agent, or Firm* — Birch, Stewart, Kolasch & Birch, LLP

(57) ABSTRACT

A gear shift device is provided which changes speed by transmitting rotation of a shift spindle by gear shift operation input to rotation of a shift drum through an intermittent feed mechanism and a lost motion mechanism. An upstream rotation holding mechanism is provided to hold in a required rotational position an upstream rotating member of the lost motion mechanism which is rotated by gear shift operation input through the intermittent feed mechanism. When a required level of gear shift operation is done, the gear shift device changes speed adequately, without continuing gear shift operation, and thus improves operability.

18 Claims, 11 Drawing Sheets

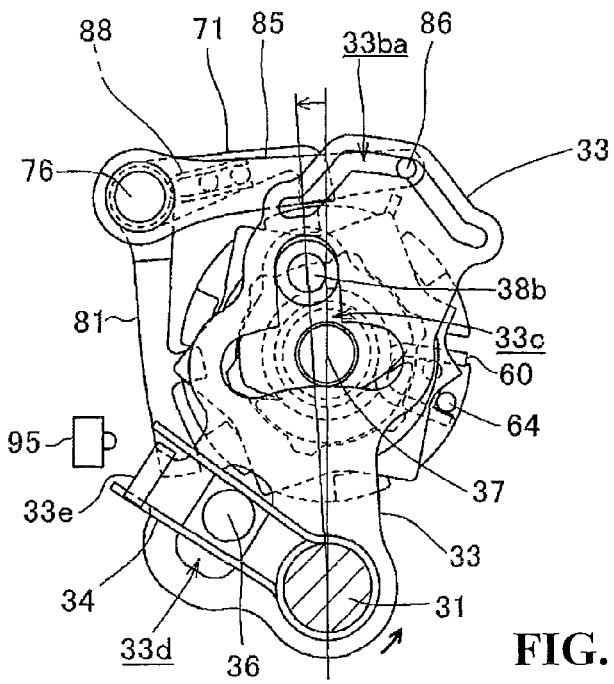
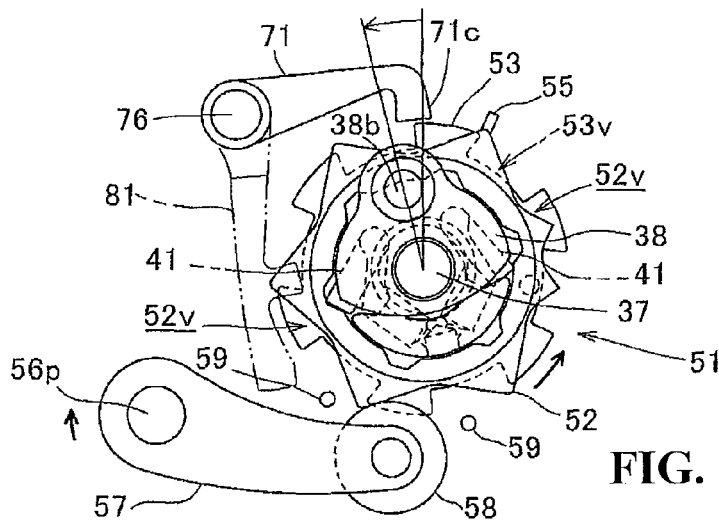
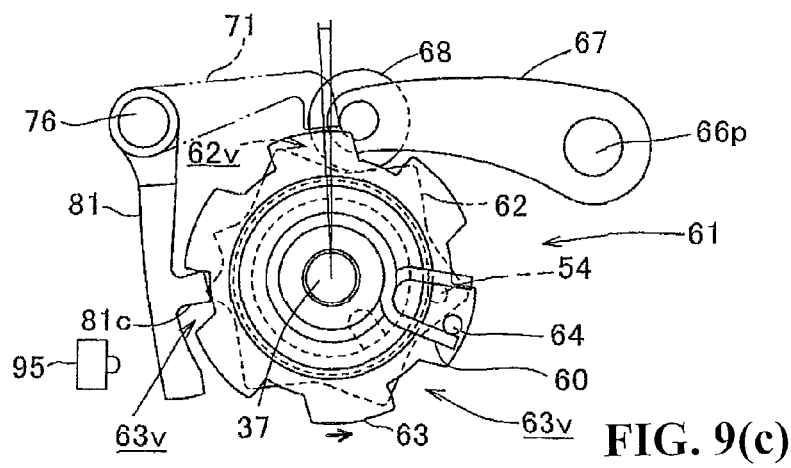
FIG. 9(a)
FIG. 9(b)
FIG. 9(c)

GEAR SHIFT DEVICE

CROSS-REFERENCE TO RELATED APPLICATION

The present application claims priority under 35 U.S.C. §119 to Japanese Patent Application Nos. 2009-087980, 2009-087981, 2009-087982, 2009-087983, filed Mar. 31, 2009, and Japanese Patent Application No. 2009-163740, filed on Jul. 10, 2009, the entire contents of which are hereby incorporated by reference.

BACKGROUND OF THE INVENTION

1. Field of the Invention

The present invention relates to a gear shift device for shifting the gear stage in a transmission mechanism.

2. Description of Background Art

At the time of gear shift when a state where a pair of gear trains in a gear transmission mechanism is transmitting power effectively is changed to a state where another gear train is transmitting power effectively, usually a clutch is disengaged to stop power transmission to permit gear shift because resistance is large during power transmission.

Also, when gear shift operation input by a shift pedal directly rotates a shift drum, gear shift operation may not be smooth in such a case as dog engagement trouble; for this reason, a lost motion mechanism is provided between a shift spindle and the shift drum in order to get a good gear shift operation feeling.

A gear shift device with such a lost motion mechanism, which is a constitution for automatically controlling clutch engagement/disengagement, is disclosed in JP-A No. 2008-221410 which was previously filed as a patent application by the same applicant.

In JP-A No. 2008-221410, since the amount of lost motion in the lost motion mechanism varies, a shift regulating mechanism for regulating rotation of the shift drum is provided downstream of the lost motion mechanism.

The shift regulating mechanism restricts rotation downstream of the lost motion mechanism to accumulate the operation force of gear shift operation, and when a sufficient force is accumulated, it removes the restriction to rotate the shift drum by the accumulated force to shift the gear stage, so gear shift operation can be done at a prescribed timing regardless of variation in the amount of lost motion.

Specifically, in the gear shift device described in JP-A No. 2008-221410, a sufficient operation force is accumulated in the lost motion mechanism by pressing the shift pedal forcefully enough and consequently the restriction by the shift regulating mechanism is removed and the shift drum is rotated by the accumulated force so that the shift fork moves the shifter in the gear transmission mechanism and changes the dog clutch connection to perform gear shift or change the speed.

Since gear shift is performed by an accumulated force in the lost motion mechanism as mentioned above, the force accumulated in the lost motion mechanism must be maintained until dog clutch connection change is finished in the gear transmission mechanism; therefore the rider must keep pressing the shift pedal until dog clutch connection change is finished.

Even when the shift pedal is pressed forcefully enough, if the shift pedal is released before completion of dog clutch connection change, the accumulated force in the lost motion mechanism will be lost and no gear shift will be performed.

In JP-A No. 2008-221410, since the lost amount in the lost motion mechanism varies, a shift regulating mechanism for regulating rotation of the shift drum is provided downstream of the lost motion mechanism.

Also, a positioning mechanism (detent mechanism) for determining the position of the shift drum for each gear stage is provided downstream of the lost motion mechanism.

Since this positioning mechanism (detent mechanism) is provided only downstream of the lost motion mechanism or there is no such mechanism upstream of it, as the rider presses the shift pedal, he/she merely feels some resistance produced by compression of a spring but does not feel a click from the detent mechanism and cannot know from a feeling of gear shift operation whether gear shift has been performed or not.

Furthermore, since the gear shift operation force accumulated in the lost motion mechanism varies, the torque of the shift drum cannot be kept optimum.

In addition, in the gear shift device described in JP-A No. 2008-221410, a sufficient operation force is accumulated in the lost motion mechanism by pressing the shift pedal forcefully enough and consequently the restriction by the shift regulating mechanism is removed and the shift drum is rotated by the accumulated force so that the shift fork moves the shifter in the gear transmission mechanism and changes the dog clutch connection to perform gear shift or change the speed.

Since gear shift is performed by an accumulated force in the lost motion mechanism as mentioned above, the force accumulated in the lost motion mechanism must be maintained until dog clutch connection change is finished in the gear transmission mechanism; therefore the rider must keep pressing the shift pedal until dog clutch connection change is finished.

Even when the shift pedal is pressed forcefully enough, if the shift pedal is released before completion of dog clutch connection change, the accumulated force in the lost motion mechanism will be lost and no gear shift will be performed.

Also, in JP-A No. 2008-221410, the rotation angle of the shift spindle is detected and disengagement of the clutch is controlled based on the detected rotation angle.

For the shift spindle on which the rider's gear shift operation works directly, its rotation speed varies depending on the rider and the way of gear shift operation and is not constant.

Therefore, disengagement of the clutch which is based on the rotation angle of the shift spindle and gear shift motion by rotation of the shift drum downstream of the lost motion mechanism do not always take place timely.

If a regulating mechanism for regulating rotation is also provided upstream of the lost motion mechanism for the above reason, means for activating the regulating mechanisms on the upstream and downstream of the lost motion mechanism must be provided and the device may be more complicated because it may be difficult to synchronize both the regulating mechanisms.

The present invention has been made in view of the above problems.

One object thereof is to provide a gear shift device which ensures that gear shift is adequately performed through input of a required level of gear shift operation without continuing the input of gear shift operation, thereby improving operability. Another object of the present invention is to provide a gear shift device which determines the position of a shift drum for each gear stage and enables the rider to feel a click upon gear shift operation input and know whether or not gear shift has been performed, and also keeps the torque of the shift drum optimum.

Another object of the present invention is to provide a gear shift device which, when a required level of gear shift operation is done, changes speed adequately without continuing gear shift operation input and thus improves operability and assures easy synchronization between the upstream and downstream sides of the lost motion mechanism through a simple structure.

Still, another object of the present invention is to provide a gear shift device which ensures smooth gear shift by disengaging the clutch timely for gear shift motion by rotation of the shift drum at any time.

SUMMARY AND OBJECTS OF THE INVENTION

According to an embodiment of the present invention, a gear shift device changes speed by transmitting rotation of a shift spindle by gear shift operation input to rotation of a shift drum through an intermittent feed mechanism and a lost motion mechanism. The device includes an upstream rotation holding mechanism which holds in a required rotational position an upstream rotating member of the lost motion mechanism which is rotated by the gear shift operation input through the intermittent feed mechanism.

According to an embodiment of the present invention, a latch mechanism for latching and regulating the rotation of the shift drum is located downstream of the lost motion mechanism.

According to an embodiment of the present invention, in a downstream latch mechanism as the latch mechanism, a latch concave corresponding to each gear stage is formed on a periphery of the downstream rotating member of the lost motion mechanism and a swinging downstream latch arm latches a latch claw at its tip in the latch concave. In an upstream latch mechanism located upstream of the lost motion mechanism, a latch concave corresponding to each gear stage is formed on a periphery of the upstream rotating member and a swinging upstream latch arm latches a latch claw at its tip in the latch concave. In addition, the upstream latch arm and the downstream latch arm have a swing center base end portion in common and are swingably journalled to a common latch arm shaft integrally.

According to an embodiment of the present invention, a latching function switching mechanism is provided in which an actuator moves the common swing center base end portion axially to disable each of the latch claws of the upstream latch arm and the downstream latch arm from being latched in the corresponding latch concave.

According to an embodiment of the present invention, the upstream rotating member of the lost motion mechanism has a stopper mechanism which prohibits rotation to a stage lower than a minimum gear stage and rotation to a stage higher than a maximum gear stage.

According to an embodiment of the present invention, a gear shift device changes speed by transmitting rotation of a shift spindle by gear shift operation input to rotation of a shift drum through a lost motion mechanism. The device includes an upstream latch mechanism for latching and holding an upstream rotating member of the lost motion mechanism and a downstream latch mechanism for latching a downstream rotating member of the lost motion mechanism and regulating rotation of the shift drum integral with the downstream rotating member.

In conjunction with a motion of the upstream latch mechanism to latch and hold the upstream rotating member, the downstream latch mechanism unlatches the downstream rotating member to rotate the shift drum and perform gear shift. An upstream detent mechanism is provided in which a roller is pressed against a prescribed concave-convex cam surface of an upstream stellar cam integral with the upstream rotating member, with a detent concave corresponding to each gear stage formed on the cam surface.

According to an embodiment of the present invention, the gear shift device includes a downstream detent mechanism in which a roller is pressed against a prescribed concave-convex cam surface of a downstream stellar cam integral with the downstream rotating member, with a detent concave corresponding to each gears stage formed on the cam surface.

According to an embodiment of the present invention, the upstream rotating member has a stopper mechanism which prohibits rotation to a stage lower than a minimum gear stage and rotation to a stage higher than a maximum gear stage.

According to an embodiment of the present invention, a gear shift device changes speed by transmitting rotation of a shift spindle by gear shift operation input to rotation of a shift drum through a lost motion mechanism. The device includes an upstream latch mechanism for latching and holding an upstream rotating member of the lost motion mechanism and a downstream latch mechanism for latching a downstream rotating member of the lost motion mechanism and regulating rotation of the shift drum integral with the downstream rotating member. The upstream latch mechanism has a latch concave corresponding to each gear stage formed on a periphery of the upstream rotating member and a latch claw at a tip of a swinging upstream latch arm is latched in the latch concave. The downstream latch mechanism has a latch concave corresponding to each gear stage formed on a periphery of the downstream rotating member and a latch claw at a tip of a swinging downstream latch arm is latched in the latch concave. The upstream latch arm and the downstream latch arm are formed integrally with a swing center base end portion in common, and in conjunction with a motion of the upstream latch arm to latch and hold the upstream rotating member in a rotational position, the downstream latch arm unlatches the downstream rotating member to rotate the shift drum and perform gear shift.

According to an embodiment of the present invention, the gear shift device includes a latching function switching mechanism in which an actuator moves the common swing center base end portion axially to make it impossible to latch each of the latch claws of the upstream latch arm and the downstream latch arm in the corresponding latch concave.

According to an embodiment of the present invention, the gear shift device includes a clutch to enable or disable transmission of power to a transmission mechanism and the clutch is disengaged in conjunction with unlatching motion of the downstream latch arm.

According to an embodiment of the present invention, a gear shift device automatically engages and disengages a clutch in response to a rider's gear shift operation and changes speed by transmitting rotation of a shift spindle by gear shift operation to rotation of a shift drum through a lost motion mechanism. A downstream latch mechanism for regulating rotation of the shift drum is provided downstream of the lost motion mechanism and in conjunction with rotation of the shift spindle, the downstream latch mechanism is unlatched to rotate the shift drum and perform gear shift and the clutch is disengaged in conjunction with an actuated position of the downstream latch mechanism.

According to an embodiment of the present invention, the gear shift device further includes an upstream latch mechanism for latching and holding an upstream rotating member of the lost motion mechanism, wherein in conduction with a motion of an upstream latch arm to latch and hold the upstream rotating member in a rotational position, the downstream latch mechanism is unlatched to rotate the shift drum and perform gear shift.

According to an embodiment of the present invention, a gear shift device changes speed by transmitting rotation of a shift spindle by gear shift operation input to rotation of a shift drum through a lost motion mechanism. The device includes an upstream latch mechanism for latching and holding an upstream rotating member of the lost motion mechanism and a downstream latch mechanism for latching a downstream rotating member of the lost motion mechanism and regulating rotation of the shift drum integral with the downstream rotating member. The upstream latch mechanism has a latch concave corresponding to each gear stage formed on a periphery of the upstream rotating member and a latch claw at a tip of a swinging upstream latch arm is latched in the latch concave. The downstream latch mechanism has a latch concave corresponding to each gear stage formed on a periphery of the downstream rotating member and a latch claw at a tip of a swinging downstream latch arm is latched in the latch concave. The upstream latch arm and the downstream latch arm are formed integrally with a swing center base end portion in common, and in conjunction with a motion of the upstream latch arm to latch and hold the upstream rotating member in a rotational position, the downstream latch arm unlatches the downstream rotating member to rotate the shift drum and perform gear shift.

According to an embodiment of the present invention, the gear shift device includes a latching function switching mechanism in which an actuator moves the common swing center base end portion axially to make it impossible to latch each of the latch claws of the upstream latch arm and the downstream latch arm in the corresponding latch concave.

According to an embodiment of the present invention, the gear shift device includes a clutch to enable or disable transmission of power to a transmission mechanism and the clutch is disengaged in conjunction with unlatching motion of the downstream latch arm.

Effects of the invention include the following:

According to an embodiment of the present invention, the gear shift device has an upstream rotation holding mechanism which holds an upstream rotating member of the lost motion mechanism, rotated by the gear shift operation through the intermittent feed mechanism from the shift spindle, in a required rotational position, so when there is a required level of gear shift operation input and the upstream rotating member of the lost motion mechanism is held in the required rotational position, the operation force is accumulated and held in the lost motion mechanism and even if gear shift operation input is stopped before completion of gear shift and the shift spindle is returned, the force accumulated and held in the lost motion mechanism rotates the shift drum without continuing gear shift operation input and thus gear shift is adequately performed and operability is improved.

According to an embodiment of the present invention, the latch mechanism for latching and regulating rotation of the shift drum is provided downstream of the lost motion mechanism, so by accumulating a gear shift operation force in the lost motion mechanism adequately and sufficiently and unlatching the latch mechanism timely, the shift drum can be rotated adequately to shift the gear stage adequately.

According to an embodiment of the present invention, the downstream latch mechanism has a latch concave corresponding to each gear stage formed on the periphery of the downstream rotating member of the lost motion mechanism and the swinging downstream latch arm latches the latch claw at its tip in the latch concave and the upstream latch mechanism located upstream of the lost motion mechanism has a latch concave corresponding to each gear stage formed on the periphery of the upstream rotating member and the swinging upstream latch arm latches the latch claw at its tip in the latch concave. The upstream latch arm and the downstream latch arm have a swing center base end portion in common and are swingably journalled to the common latch arm shaft integrally, so in conjunction with a motion of the upstream latch mechanism to latch and hold the upstream rotating member, the downstream latch mechanism unlatches the downstream rotating member to rotate the shift drum for gear shift and when there is a required level of gear shift operation input, gear shift is performed adequately.

According to an embodiment of the present invention, since a latching function switching mechanism is provided in which an actuator moves the common swing center base end portion axially to disable the latch claws of the upstream latch arm and the downstream latch arm from being latched in the corresponding latch concaves, when the latching function switching mechanism for disabling or enabling the latching functions of the upstream latch mechanism and downstream latch mechanism enables both the latching functions, when there is a required level of gear shift operation input, gear shift is adequately performed and the shift drum is always in a rotational position for a gear stage and does not rotate and stop in the neutral position.

Therefore, when the latching function switching mechanism enables both the latching functions during a run, the shift drum is prevented from being set in the neutral position and the rider need not be careful in gear shift operation in order to prevent the shift drum from being set in the neutral position, so high operability is assured.

According to an embodiment of the present invention, the upstream rotating member of the lost motion mechanism has a stopper mechanism which prohibits rotation to a stage lower than a minimum gear stage and rotation to a stage higher than a maximum gear stage, so even if the rider attempts to shift down to a stage lower than the minimum gear stage or up to a stage higher than the maximum gear stage, he/she fails to do so and can easily know that the current gear stage is the minimum gear stage or maximum gear stage.

According to an embodiment of the present invention, the upstream detent mechanism, along with the upstream latch mechanism, is located upstream of the lost motion mechanism and the upstream detent mechanism gives a feel of a click upon gear shift operation input and makes it possible to know whether or not gear shift has been performed.

According to an embodiment of the present invention, the downstream detent mechanism, along with the downstream latch mechanism, is located downstream of the lost motion mechanism, so the downstream detent mechanism can give a more stable amount of rotation to the shift drum.

Furthermore, the upstream detent mechanism and downstream detent mechanism optimize the gear shift operation force accumulated in the lost motion mechanism between them to set the torque of the shift drum and keep the torque of the shift drum adequate.

According to an embodiment of the present invention, the upstream rotating member has a stopper mechanism which prohibits rotation to a stage lower than a minimum gear stage and rotation to a stage higher than a maximum gear stage, so even if the rider attempts to shift down to less than the minimum gear stage or up to more than the maximum gear stage, he/she fails to do so and can know that the current gear stage is the minimum gear stage or maximum gear stage.

According to an embodiment of the present invention, an upstream latch mechanism for latching and holding an upstream rotating member of the lost motion mechanism and a downstream latch mechanism for latching a downstream rotating member of the lost motion mechanism and regulating rotation of the shift drum integral with the downstream rotating member are provided.

In conjunction with a motion of the upstream latch arm to latch and hold the upstream rotating member in a rotational position, the downstream latch arm unlatches the downstream rotating member to rotate the shift drum and perform gear shift. Therefore, when there is a required level of gear shift operation input and the upstream rotating member of the lost motion mechanism is held in a required rotational position. Even if gear shift operation input is stopped before completion of gear shift and the shift spindle is returned, the same condition as when there is gear shift operation input is maintained because the upstream rotating member of the lost motion mechanism is latched and thus the shift drum is rotated without continuing gear shift operation input so that gear shift is adequately performed and operability is improved.

Furthermore, the upstream latch arm and the downstream latch arm are formed integrally with a swing center base end portion in common and in conjunction with a motion of the upstream latch arm to latch and hold the upstream rotating member in a rotational position, the downstream latch arm unlatches the downstream rotating member to rotate the shift drum and perform gear shift, so the upstream and downstream sides of the lost motion mechanism are synchronized easily through a simple structure.

According to an embodiment of the present invention, in the latching function switching mechanism, the actuator moves the common swing center base end portion axially to make it impossible to latch the latch claws of the upstream latch arm and the downstream latch arm in the corresponding latch concaves, so the actuator of the latching function switching mechanism moves the upstream latch arm and downstream latch arm simultaneously through a single simple structure so that both the latching functions of the upstream latch mechanism and downstream latch mechanism are disabled easily.

According to an embodiment of the present invention, a clutch for enabling or disabling transmission of power to a transmission mechanism is provided and the clutch is disengaged in conjunction with an unlatching motion of the downstream latch arm. Therefore, by disengaging the clutch in conjunction with an actuated position of the upstream latch arm to hold the upstream rotating member in a required rotational position, the shift drum is rotated without continuing gear shift operation input so that gear shift is performed adequately and clutch control is constantly performed regardless of differences of individual parts.

According to an embodiment of the present invention, a downstream latch mechanism for regulating rotation of the shift drum is provided downstream of the lost motion mechanism and in conjunction with rotation of the shift spindle. The downstream latch mechanism is unlatched to rotate the shift drum and perform gear shift and the clutch is disengaged in conjunction with an actuated position of the downstream latch mechanism, so regardless of how gear shift operation is carried out, disengagement of the clutch is controlled timely for gear shift motion by rotation of the shift drum at any time and gear shift is performed smoothly.

According to an embodiment of the present invention, the upstream latch mechanism for latching and holding the upstream rotating member of the lost motion mechanism is provided and in conduction with a motion of the upstream latch arm to latch and hold the upstream rotating member in a rotational position. The downstream latch mechanism is unlatched to rotate the shift drum and perform gear shift, so when there is a required level of gear shift operation input to the shift spindle and the upstream rotating member of the lost motion mechanism is held in a required rotational position, even if gear shift operation input is stopped before completion of gear shift and the shift spindle is returned, the same condition as when there is gear shift operation input is maintained because the upstream latch arm latches the upstream rotating member of the lost motion mechanism. Thus, the shift drum is rotated without continuing gear shift operation input so that gear shift is adequately performed and operability is improved.

According to an embodiment of the present invention, an upstream latch mechanism for latching and holding an upstream rotating member of the lost motion mechanism and a downstream latch mechanism for latching a downstream rotating member of the lost motion mechanism and regulating rotation of the shift drum integral with the downstream rotating member are provided. In conjunction with a motion of the upstream latch arm to latch and hold the upstream rotating member in a rotational position, the downstream latch arm unlatches the downstream rotating member to rotate the shift drum and perform gear shift. Therefore, when there is a required level of gear shift operation input and the upstream rotating member of the lost motion mechanism is held in a required rotational position, even if gear shift operation input is stopped before completion of gear shift and the shift spindle is returned, the same condition as when there is gear shift operation input is maintained because the upstream rotating member of the lost motion mechanism is latched and thus the shift drum is rotated without continuing gear shift operation input so that gear shift is adequately performed and operability is improved.

Furthermore, the upstream latch arm and the downstream latch arm are formed integrally with a swing center base end portion in common and in conjunction with a motion of the upstream latch arm to latch and hold the upstream rotating member in a rotational position, the downstream latch arm unlatches the downstream rotating member to rotate the shift drum and perform gear shift, so the upstream and downstream sides of the lost motion mechanism are synchronized easily through a simple structure.

According to an embodiment of the present invention, in the latching function switching mechanism, the actuator moves the common swing center base end portion axially to make it impossible to latch the latch claws of the upstream latch arm and the downstream latch arm in the corresponding latch concaves. Thus, the actuator of the latching function switching mechanism moves the upstream latch arm and downstream latch arm simultaneously through a single simple structure so that both the latching functions of the upstream latch mechanism and downstream latch mechanism are disabled easily.

According to an embodiment of the present invention, a clutch for enabling or disabling transmission of power to a transmission mechanism is provided and the clutch is disengaged in conjunction with an unlatching motion of the downstream latch arm, so by disengaging the clutch in conjunction with an actuated position of the upstream latch arm to hold the upstream rotating member in a required rotational position, the shift drum is rotated without continuing gear shift operation input so that gear shift is performed adequately and clutch control is constantly performed regardless of differences of individual parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(a) to (c) are side views showing key parts of the gear shift device in a step in which they change with gear shift operation input;

DETAILED DESCRIPTION OF THE PREFERRED EMBODIMENTS

Next, one embodiment of the present invention will be described referring to FIGS. 1 to 13.

Figure 1:
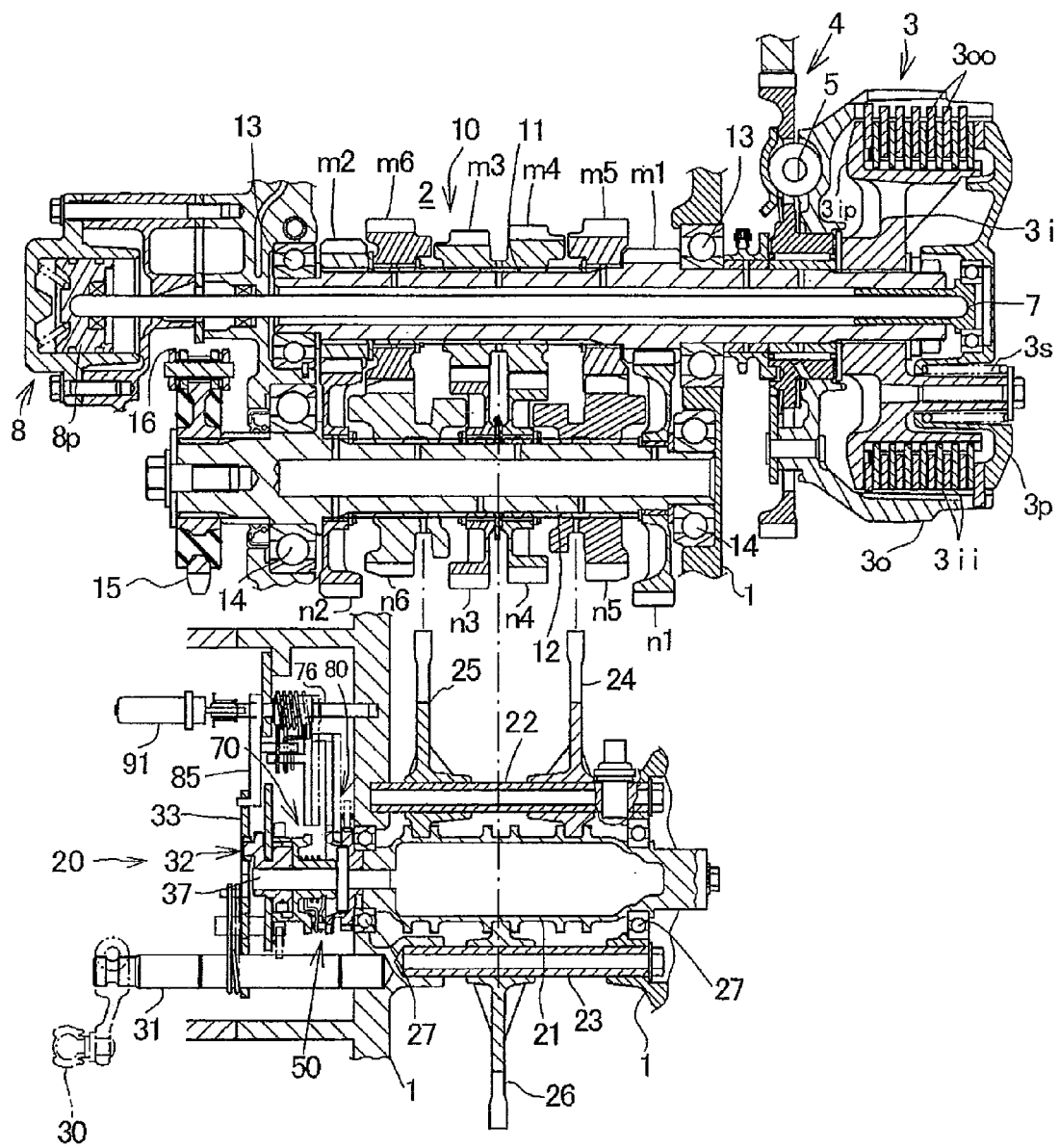
FIG. 1 is a sectional view of a transmission of a motorcycle according to an embodiment of the present invention.

FIG. 1 is a sectional view of a transmission of a motorcycle according to this embodiment.

A transmission chamber 2 is formed in an engine case 1 of an internal combustion engine mounted in the motorcycle with its crankshaft oriented in the vehicle body width direction (transverse or left-right direction) and a gear transmission mechanism 10 for the transmission is constructed in the transmission chamber 2.

A main shaft 11 as a gear shift input shaft, and a counter shaft 12 as an output shaft, are oriented transversely and rotatably journalled to the left and right sidewalls of the engine case 1 constituting the transmission chamber 2, through bearings 13 and 14 respectively.

The gear transmission mechanism 10 is constructed between the main shaft 11 and counter shaft 12 which are parallel to each other.

On the main shaft 11, from right to left, a first-speed drive gear m1, fifth-speed drive gear m5, fourth-speed drive gear m4, third-speed drive gear m3, sixth-speed drive gear m6, and second-speed drive gear m2 are disposed sequentially; the first-speed drive gear m1 is formed integrally on the main shaft 11; the fifth-speed drive gear m5 is an idle gear rotatably journalled to the main shaft 11; the fourth-speed drive gear m4 and third-speed drive gear m3 are shifter gears integrally formed and spline-fitted to the main shaft 11; the sixth-speed drive gear m6 is an idle gear rotatably journalled to the main shaft 11; and the second-speed drive gear m2 is fitted to the main shaft 11.

On the other hand, on the counter shaft 12, from right to left, a first-speed driven gear n1, fifth-speed driven gear n5, fourth-speed driven gear n4, third-speed driven gear n3, sixth-speed driven gear n6, and second-speed driven gear n2 are disposed sequentially; the first-speed driven gear n1 is an idle gear rotatably journalled to the counter shaft 12; the fifth-speed driven gear n5 is a shifter gear spline-fitted to the counter shaft 12; the fourth-speed driven gear n4 and third-speed driven gear n3 are idle gears rotatably journalled to the counter shaft 12; the sixth-speed driven gear n6 is a shifter gear spline-fitted to the counter shaft 12; and the second-speed driven gear n2 is an idle gear rotatably journalled to the counter shaft 12.

The gear transmission mechanism 10 is a constantly engaged speed change gear mechanism in which drive gears and driven gears which match each other are constantly engaged with each other.

When the third-speed drive gear m3 and the fourth-speed drive gear n4 as an integral shifter gear on the main shaft 11, and the fifth-speed driven gear n5 and sixth-speed driven gear n6 as shifter gears on the counter shaft 12, are moved axially and by engagement/disengagement of the dog clutches of neighboring gears, one pair of gear trains (engagement between a drive gear and a driven gear) effectively transmits power and establishes a gear stage and power is transmitted from the main shaft 11 to the counter shaft 12 at the gear ratio of the established gear stage.

The gear transmission mechanism 10 has a neutral position in which all gear trains are ineffective and power transmission does not take place.

Power of the crankshaft (not shown) of the internal combustion engine is transmitted to the main shaft 11 and a multi-plate friction clutch 3 for enabling or disabling power transmission lies between them.

Power is transmitted from the crankshaft to a clutch outer 3o of the multi-plate friction clutch 3 through a primary gear train 4 and a torque damper 5.

In the multi-plate friction clutch 3, a clutch inner 3i is fitted to the right end of the main shaft 11, and the clutch outer 3o, rotatably journalled to the main shaft 11, covers the periphery of the clutch inner 3i and therebetween, drive friction plates 3oo spline-fitted to the clutch outer 3o and driven friction plates 3ii spline-fitted to the clutch inner 3i overlap axially and alternately and lie between a pressure receiving plate 3ip formed on the clutch inner 3i on the left and a pressurizing plate 3p supported axially and slidably by the clutch inner 3i on the right.

The pressurizing plate 3p is biased leftward by a clutch spring 3s.

The main shaft 11 is in the form of a cylinder with a push rod 6 penetrating its inside in which the right end of the push rod 6 protruding rightward from the main shaft 11 is coupled with the pressurizing plate 3p through a release member 7.

On the other hand, the left end of the push rod 6, penetrating the engine case 1, is fitted to the piston 8p of a slave hydraulic cylinder 8.

The slave hydraulic cylinder 8 is driven by a master hydraulic cylinder controlled by an ECU.

Therefore, as the slave hydraulic cylinder 8 is activated and the piston 8 pushes the push rod 6 rightward, the pressurizing plate 3p is moved rightward against the spring force of the clutch spring 3s through the release member 7 and the multi-plate friction clutch 3 which has been engaged by the spring force of the clutch spring 3s is disengaged.

In the gear transmission mechanism 10, when shifting the gear stage by movement of shifter gears, the dog clutches are disengaged/engaged; however, while power transmission from the main shaft 11 to the counter shaft 12 is under way, gear shift cannot be performed smoothly because of a large resistance caused by dog clutch disengagement, so it is necessary to stop power transmission by disengaging the multi-plate friction clutch 3.

A drive sprocket 15 is fitted to the left end of the counter shaft 12 as the output shaft which penetrates the engine case 1 leftward and power of the gear stage established by the gear transmission mechanism 10 is transmitted from the drive sprocket 15 through a chain 16 to the rear wheel for the vehicle to run.

A gear shift device 20 which moves the shifter gears of the gear transmission mechanism 10 to change the speed is described below.

In the gear shift device 20, as a shift drum 21 rotates, shift forks 24, 25 and 26 slidably journalled to shift fork shafts 22 and 23 are guided by a shift groove 21v formed in the outer circumferential surface of the shift drum 21 to move axially and the shift fork 26 moves together the third-speed drive gear m3 and fourth-speed drive gear m4 as shift gears spline-fitted to the main shaft 11, and the shift fork 24 moves the fifth-speed driven gear n5 as a shift gear spline-fitted to the counter shaft 12, and the shift fork 25 moves the sixth-speed driven gear n6 as a shift gear to shift the gear stage.

The shift drum 21 of the gear shift device 20 is rotated by the rider operating the shift pedal 30 with his/her foot.

How the operation force applied to the shift pedal 30 in the gear shift device 20 is transmitted to rotation of the shift drum 21 will be explained referring to FIGS. 2 to 13.

The shift pedal 30 is fitted to the left end of a shift spindle 31 protruding leftward from the engine case 1 and the shift spindle 31 is rotated by swinging the shift pedal 30.

The master arm 33 of an intermittent feed mechanism 32 is fitted to the shift spindle 31 and it swings together with the shift spindle 31.

Figure 3:
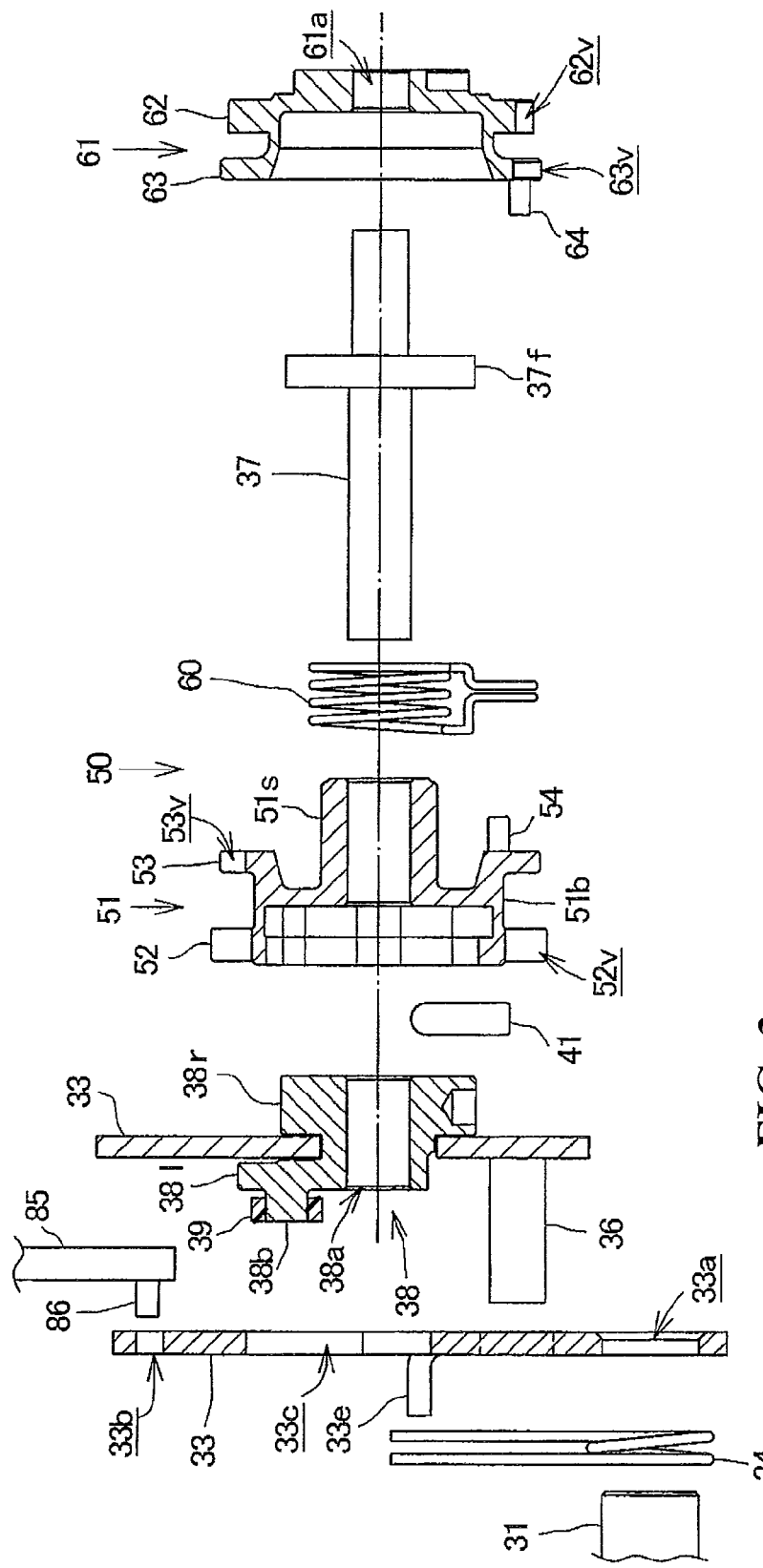
FIG. 3 is an exploded sectional view of part of the gear shift device.
Figure 4:
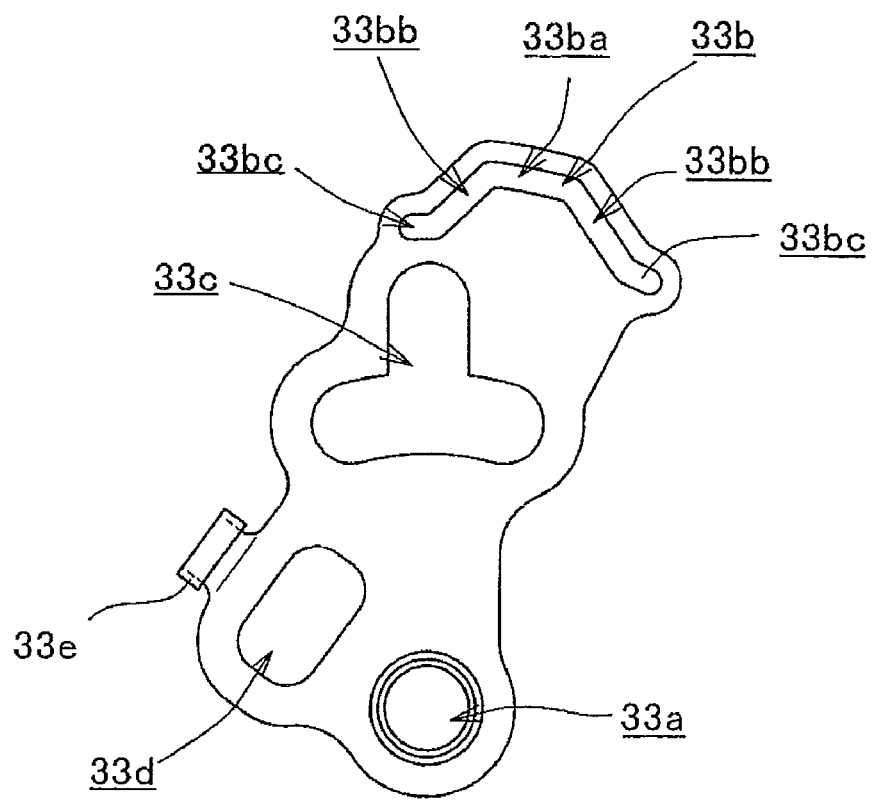
FIG. 4 is a left side view of a master arm.

As shown in FIGS. 3 and 4, the master arm 33 is a vertically long plate in which the shift spindle 31 is passed and fitted through a circular hole 33a at its base end, a thin and long cam hole 33b bent into a prescribed shape is formed at its tip, a convex drive hole 33c is pierced between the circular hole 33a at the base end and the cam hole 33b at the tip, a rectangular regulating hole 33d is formed at an acute angle with respect to the direction from the circular hole 33a to the drive hole 33c, and a lock piece 33e is formed as a bent end in the direction from the circular hole 33a to the regulating hole 33d.

The cam hole 33b consists of a center arc portion 33ba with the circular hole 33a at the base end as the center, oblique portions 33bb on both sides of it, and end arc portions 33bc on both sides with the circular hole 33a as the center.

In the convex drive hole 33c, particularly the oblong hole in the radial direction from the center of swing at the base end is a portion which works effectively.

Figure 2:
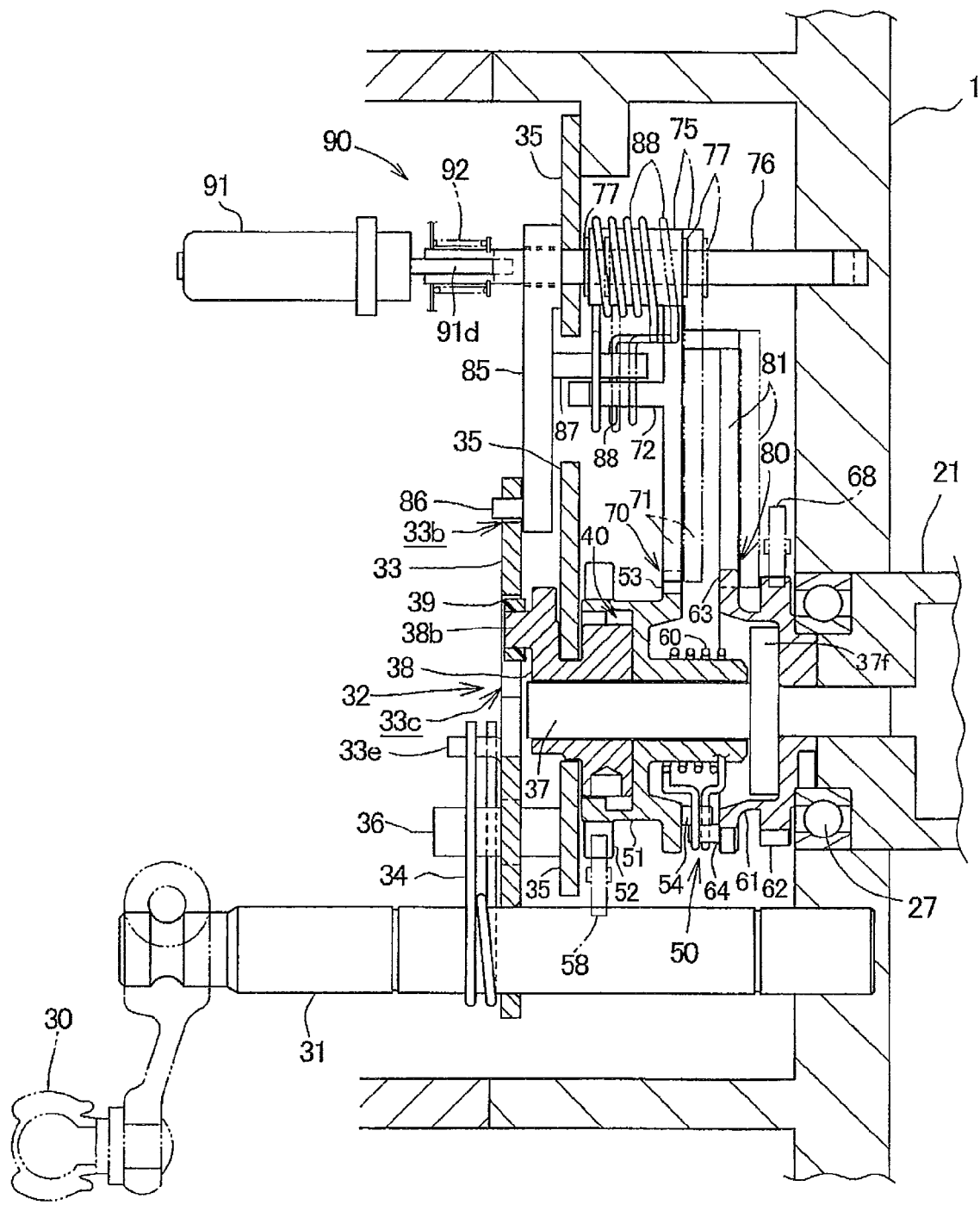
FIG. 2 is a sectional view of a gear shift device of the present invention.
Figure 8A:
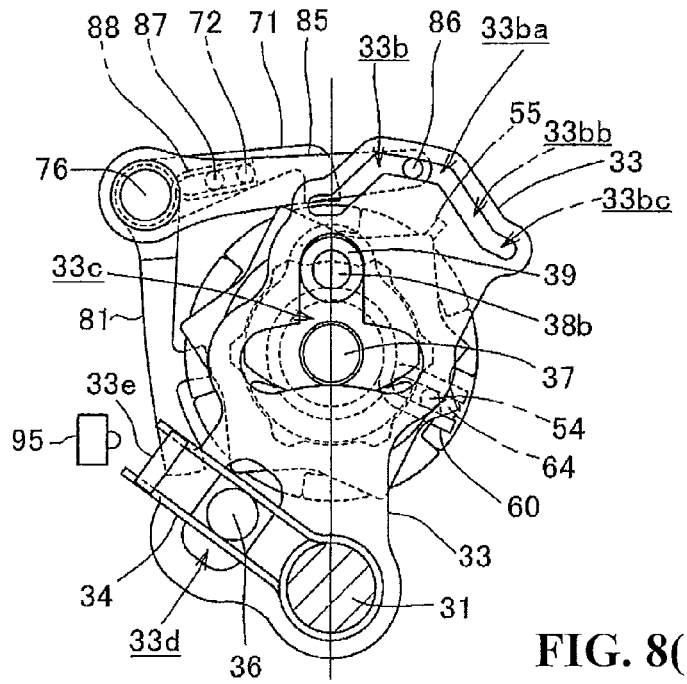
FIGS. 8(a) to (c) are side views showing key parts of the gear shift device in which a gear stage is established.

Referring to FIG. 2 and FIG. 8(a), the coil of a return spring 34 is wound around the shift spindle 31 fitted through the circular hole 33a of the master arm 33 and both its ends, extending in the same direction, are fitted in a way to sandwich the lock piece 33e of the master arm 33 from outside.

The cylindrical pin 36, projecting leftward from a prescribed point of a guide plate 35 fixed on the inside of the maser arm 33, penetrates the rectangular regulating hole 33d of the master arm 33 and protrudes between both the spring ends extending from the coil of the return spring 34 in the same direction and lies between both the ends (see FIG. 8(a)).

Therefore, the cylindrical pin 36 protruding from the guide plate 35 and the lock piece 33e of the master arm 33 are sandwiched between both the ends extending in the same direction from the coil of the return spring 34 with the coil wound around the shift spindle 31.

When the cylindrical pin 36 and lock piece 33e are in the same direction from the shift spindle 31, the master arm 33 is in the neutral position, and as the shift spindle 31 is rotated by pressing the shift pedal 30 and the master arm 33 swings toward a certain direction, the cylindrical pin 36 presses one end of the return spring 34 and the lock piece 33e of the master arm 33 pushes the other end open against the spring force, so that a biasing force is applied to the master arm 33 to return it to the neutral position.

Therefore, as the action of pressing the shift pedal 30 is stopped and the operation force applied to the master arm 33 through the shift spindle 31 is removed, the master arm 33 is returned to its original neutral position along with the shift pedal 30 by the return spring 34.

The swing motion of the master arm 33 is limited to the range defined by the regulating hole 33d in which the cylindrical pin 36 lies.

A shift drum shaft 37 integrally protrudes leftward with its right end fitted in the left end portion of the shift drum 21 whose ends are journalled to the engine case 1 through bearings 27 and the shift drum shaft 37 is on the axis of the center of rotation of the shift drum 21 and is parallel and adjacent to the shift spindle 31.

A shift input member 38 is journalled to the left end portion of the shift drum shaft 37 adjacently to the master arm 33 in a relatively rotatable manner.

The shift input member 38 penetrates the guide plate 35.

Figure 5:
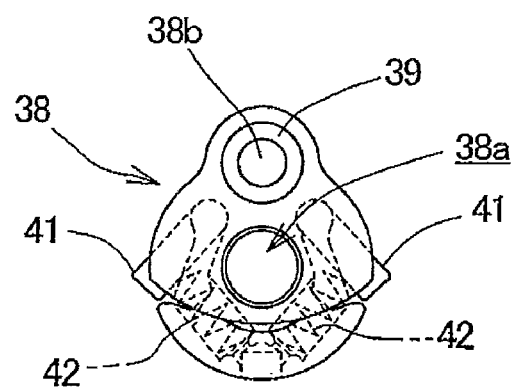
FIG. 5 is a left side view of a shift input member.

As shown in FIGS. 3 and 5, the shift input member 38 has a shaft hole 38a as the center of rotation through which the shift drum shaft 37 passes and a driven boss 38b protrudes leftward on its portion 38l on the left of the guide plate 35 in an eccentric position from the shaft hole 38a (see FIG. 3) and a circular sliding member 39 is fitted onto the driven boss 38b and slidably fitted in the drive hole 33c of the master arm 33 (see FIG. 2).

Particularly, since the driven boss 38b fits in the radially extending oblong hole of the drive hole 33c of the master arm 33 through the circular sliding member 39, as the master arm 33 swings, the driven boss 38b is guided in the swinging drive hole 33c so that the shift input member 38 rotates on the shift drum shaft 37.

On a portion 38r of the shift input member 38 on the right of the guide plate 35, a pair of poles 41 of a pole latchet mechanism 40 are fitted obliquely and symmetrically to each other in a way that they can swing and go up and down freely, and a pair of springs 42 which protrude and bias the tips of the poles 41 centrifugally are provided.

On the shift drum shaft 37, the lost motion mechanism 50 lies between the shift input member 38 and shift drum 21.

The lost motion mechanism 50 has a lost motion spring 60 between an upstream rotating member 51 rotatably journalled to the shift drum shaft 37 and a downstream rotating member 61 integrally fitted and journalled to the shift drum shaft 37.

Figure 6:
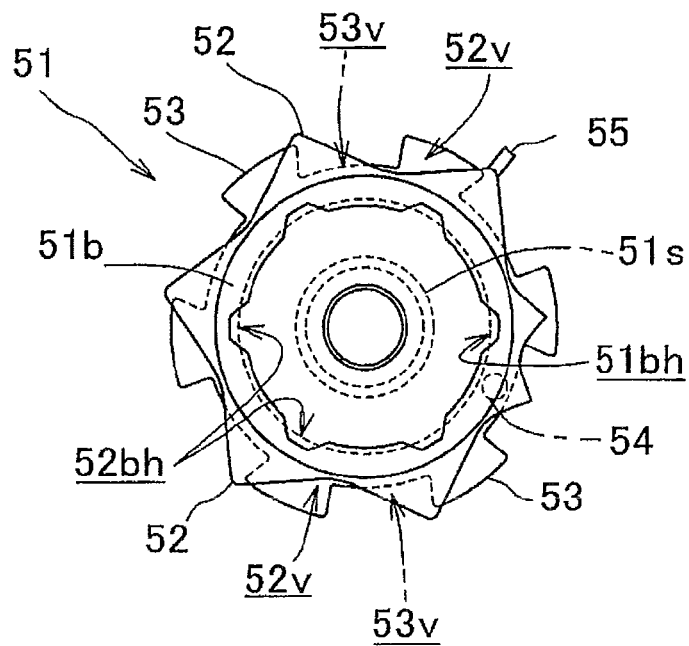
FIG. 6 is a left side view of an upstream rotating member of a lost motion mechanism.

Referring to FIGS. 3 and 6, in the upstream rotating member 51, a large-diameter cylinder 51b on the upstream (left) and a small-diameter cylinder 51s on the downstream (right)

are coaxially and continuously formed in which the shift drum shaft 37, penetrating the small-diameter cylinder 51s, is rotatably journalled.

Figure 8B:
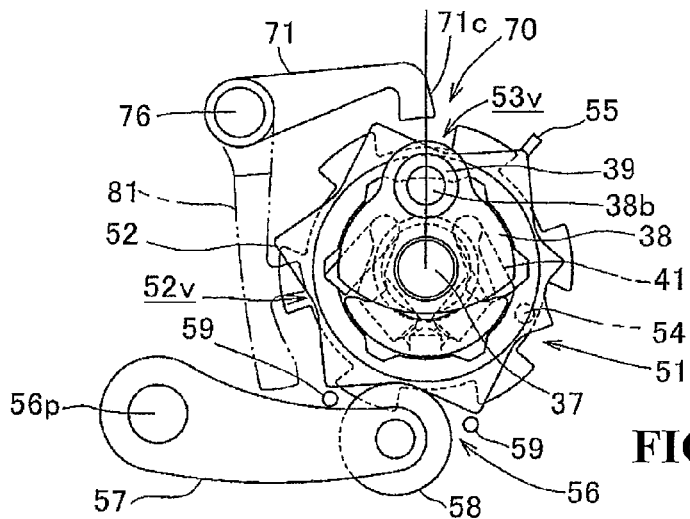

Six inner concaves 51bh are formed at regular intervals in the circumferential direction on the inner circumferential surface of the large-diameter cylinder 51b and when the right portion 38r of the shift input member 38 is inserted into the large-diameter cylinder 51b (see FIG. 2), the tips of the paired poles 41 biased centrifugally by the springs 42 of the pole latchet mechanism 40 are pushed against the inner circumferential surface of the large-diameter cylinder 51b to constitute the pole latchet mechanism 40 (FIG. 8(b)).

More specifically, regarding each pole 41 of the pole ratchet mechanism 40, when the shift input member 38 rotates in one direction, the tip of the pole 41 in its upright position is latched to one circumferentially-oriented latching surface of an inner concave 51bh to rotate the upstream rotating member 51; on the other hand, when it rotates in the other direction, the pole falls and its tip gets out of the inner concave 51bh and does not rotate the upstream rotating member 51.

Therefore, when the swing motion of the master arm 33 rotates the shift input member 38 in either direction by a prescribed angle, the tip of one of the paired poles 41 which are pressed against the inner circumferential surface of the large-diameter cylinder 51b of the upstream rotating member 51 gets into the inner concave 51bh and is latched to the latching surface of the inner concave 51bh to rotate the upstream rotating member 51, and then when the master arm 33 returns to its original neutral position and the shift input member 38 rotates in the opposite direction, the pole 41 latched to the inner concave 51bh gets out of the inner concave 51bh and leaves the upstream rotating member intact, thus feeding the upstream rotating member 51 intermittently.

As shown in FIG. 6, on the outer circumferential surface of the large-diameter cylinder 51b of the upstream rotating member 51, an upstream stellar cam 52 is integrally fitted on the left and a latch flange 53 is integrally formed on the right.

In the upstream stellar cam 52, a prescribed concave-convex cam surface, on which upstream detent concaves 52v corresponding to the first to sixth speed gear stages and neutral position are sequentially formed, is continuously formed in the circumferential direction.

In the upstream latch flange 53, upstream latch concaves 53v corresponding to the different gear stages are sequentially formed every 60 degrees of center angle by cutting the outer circumferential edge.

Regarding the upstream latch concaves 53v, opposing latching surfaces are circumferentially formed at an acute angle of less than 90 degrees with respect to the bottom surface.

Also, in the upstream rotating member 51, a lock pin 54 protrudes rightward axially from a prescribed point on the right side face of the upstream latch flange 53 and a stopper piece 55 protrudes radially between the upstream detent concaves 52v corresponding to the first and sixth speed parts of the upstream stellar cam 52 respectively.

Figure 7:
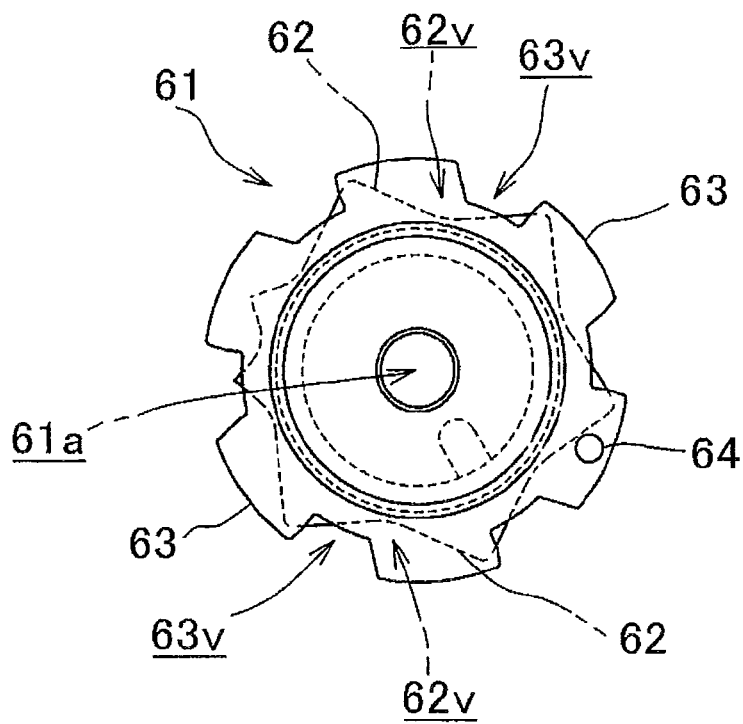
FIG. 7 is a left side view of a downstream rotating member of the lost motion mechanism.

On the other hand, referring to FIGS. 3 and 7, the downstream rotating member 61 of the lost motion mechanism 50 is a flat bottomed cylinder in which a shaft hole 61a is pierced in its bottom wall and a downstream stellar cam 62 is integrally formed on the outer circumferential surface of the cylinder on the right and a downstream latch flange 63 is integrally formed on the left.

In the downstream stellar cam 62, a prescribed concave-convex cam surface, on which downstream detent concaves 62v corresponding to the first to sixth speed gear stages and neutral position are sequentially formed, is continuously formed in the circumferential direction.

In the downstream latch flange 63, downstream latch concaves 63v corresponding to the different gear stages are sequentially formed every 60 degrees of center angle by cutting the outer circumferential edge.

Regarding the downstream latch concaves 63v, opposing latching surfaces are circumferentially formed at an obtuse angle of more than 90 degrees with respect to the bottom surface.

Also, in the downstream rotating member 61, a lock pin 64 protrudes leftward axially from a prescribed point on the left side face of the downstream stellar cam 62.

Regarding the downstream rotating member 61, the shift drum shaft 37 is inserted from left into the shaft hole 61a pierced in the bottom wall (see FIG. 3) and as shown in FIG. 2, the inserted shaft portion further fits into the shaft hole pierced in the center of rotation at the left end of the shift drum 21 and a flange 37f formed midway on the shift drum shaft 37 pinches the bottom wall of the downstream rotating member 61 with the shift drum 21 to connect the downstream rotating member 61 and shift drum 21 together with the shift drum shaft 37.

The bearings 27 which pivotally support the shift drum 21 rotatably also pivotally support the downstream rotating member 61 (see FIG. 2).

Figure 8C:
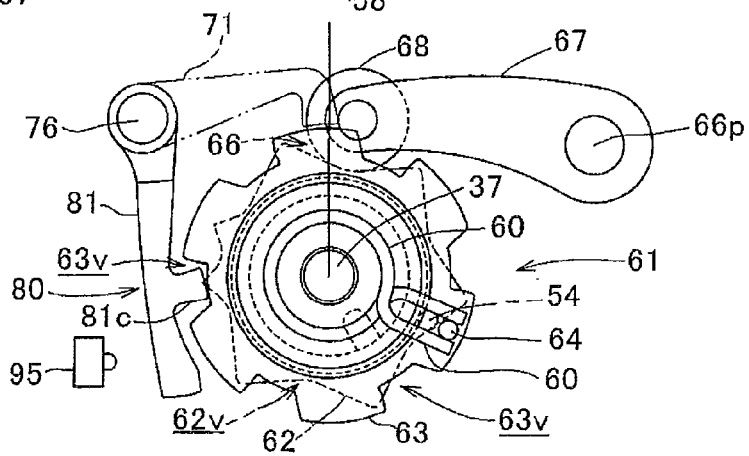

The coil of the lost motion spring 60 as a torsion coil spring, is wound around the small-diameter cylinder 51s of the upstream rotating member 51 rotatably journalled to the shift drum shaft 37 and the right end portion of the small-diameter cylinder 51s is inserted into the cylinder of the downstream rotating member 61 and the ends of the lost motion spring 60 extending radially from the coil are elastically squeezed and locked on the rightward-protruding lock pin 54 of the upstream rotating member and the leftward-protruding lock pin 64 of the downstream rotating member 61 (see FIGS. 2 and 8(c)).

Since the lock pin 54 of the upstream rotating member 51 and the lock pin 64 of the downstream rotating member 61 are slightly out of alignment with each other in the radial direction, they are pinched elastically between both ends of the lost motion spring 60 in the same direction from the shift drum shaft 37 so that relative rotation of the upstream rotating member 51 and downstream rotating member 61 is elastically limited by the lost motion spring 60.

Rotation of the upstream rotating member 51 is transmitted to the downstream rotating member 61 through the elastic force of the lost motion spring 60, thus constituting the lost motion mechanism 50.

As shown in FIG. 8(b), a roller 58 rotatably journalled to the tip of an upstream detent arm 57 biased by a torsion spring (not shown) with a base end swingably journalled to a spindle 56p is pressed on the concave-convex cam surface of the upstream stellar cam 52 of the upstream rotating member 51 in the lost motion mechanism 50, thus constituting an upstream detent mechanism 56.

Therefore, the upstream detent mechanism 56 determines the rotational position of the upstream rotating member 51 in a way that the roller 58 fits in the upstream detent concave 52 corresponding to each gear stage on the concave-convex cam surface of the upstream stellar cam 52.

As shown in FIG. 8(c), a roller 68 rotatably journalled to the tip of a downstream detent arm 67 biased by a torsion spring (not shown) with a base end swingably journalled to a spindle 66p is pressed on the concave-convex cam surface of the downstream stellar cam 62 of the downstream rotating member 61, thus constituting a downstream detent mechanism 66.

Therefore, the downstream detent mechanism 66 determines the rotational position of the downstream rotating member 61 in a way that the roller 68 fits in the downstream detent concave 62 corresponding to each gear stage on the concave-convex cam surface of the downstream stellar cam 62 and the neutral position.

Although in the upstream detent mechanism 56 and the downstream detent mechanism 66, the spindle 56p of the upstream detent arm 57 and the spindle 66p of the downstream detent arm 67 are located in different places, instead the spindles may be replaced by one common spindle in order to decrease the number of spindles and arrange the upstream and downstream detent mechanisms in a compact manner.

Referring to FIG. 8(b), in the upstream rotating member 51, the upstream stellar cam 52 has a stopper piece 55 protruding radially between the upstream detent concaves 52v corresponding to the first and sixth speeds, and when the stopper pin 59 touches two stopper pins 59 protruding from prescribed points on both sides in a way to sandwich the roller 58 at the tip of the upstream detent arm 57 on the right side face of the guide plate 35, rotation of the upstream rotating member 51 is limited to a prescribed rotation angle range (rotation angle range corresponding to the first to sixth speeds).

In other words, while the upstream rotating member 51 is rotated and placed in a position for each of the gear stages for the first to sixth speeds by the upstream detent mechanism 56, the stopper mechanism, including the stopper piece 55 and stopper pins 59, prohibits its rotation to a position for a lower speed stage than the first speed stage (minimum gear stage) and a position for a higher speed stage than the sixth speed stage (maximum gear stage).

Next, an upstream latch mechanism 70 for latching an upstream latch arm 71 in an upstream latch concave 53v of the upstream rotating member 51 and a downstream latch mechanism 80 for latching a downstream latch arm 81 in a downstream latch concave 63v of the downstream rotating member 61 will be described.

Referring to FIGS. 2 and 8(a) to (c), the upstream latch arm 71 and downstream latch arm 81 have a common swing center base end portion 75 and the swing center base end portion 75 is rotatably journalled to a latch arm shaft 76 oriented transversely and installed on the engine case 1 and guide plate 35 in an axially slidable manner.

Therefore, the upstream latch arm 71 and downstream latch arm 81 are swingably journalled on the latch arm shaft 76 integrally.

The swing center base end portion 75 is supported in a prescribed position on the latch arm shaft 76 between C-shaped retaining rings 77 where its relative axial movement on the latch arm shaft 76 is limited and its relative rotation is permitted.

Therefore, the upstream latch arm 71 and downstream latch arm 81 which share the swing center base end portion 75 move axially (transversely) together with the latch arm shaft 76.

When the upstream latch arm 71 and downstream latch arm 81, which share the swing center base end portion 75 and are formed integrally, are axially in prescribed positions on the left, the upstream latch arm 71 extends from the right end of the swing center base end portion 75 toward the outer periphery of the upstream latch flange 53 of the upstream rotating member 51 with its tip bent toward the upstream latch flange 53 to form a latch claw 71c so that the latch claw 71c can be latched in an upstream latch concave 53v formed in the upstream latch flange 53 (see FIG. 8(b)).

Since the width of the latch claw 71c increases from its bent part to its tip, once it is latched to the acutely-angled latching surface of the upstream latch concave 53v, they are engaged and even when the upstream latch arm 71 swings, unlatching does not occur until the upstream latch concave 53v rotates in the unlatching direction.

Similarly, the downstream latch arm 81 once bends rightward axially from the right end of the swing center base end portion 75 and extends toward the outer periphery of the downstream latch flange 63 of the downstream rotating member 61 with a latch claw 81c, protruding toward the downstream latch flange 63, formed midway so that the latch claw 81c can be latched in a downstream latch concave 63v formed in the downstream latch flange 63 (see FIG. 8(c)).

The upstream latch arm 71 and downstream latch arm 81, which extend from the common swing center base end portion 75, are separately located on the left and right in the axial direction (see FIG. 2) and in a left side view (axial view) they extend virtually perpendicularly to each other (see FIG. 8(a)).

The upstream latch arm 71 is located on the left in the axial direction and the downstream latch arm 81 is located on the right in the axial direction.

Since the upstream latch arm 71 and downstream latch arm 81 extend virtually perpendicularly to each other in a way to sandwich the upstream rotating member 51 and downstream rotating member 61 in an axial view, when the latch claw 71c of the upstream latch arm 71 is latched in the upstream latch concave 53v, the latch claw 81c of the downstream latch arm 81 is unlatched from the downstream latch concave 63v and conversely when the latch claw 81c of the downstream latch arm 81 is latched in the downstream latch concave 63v, the latch claw 71c of the upstream latch arm 71 is unlatched from the upstream latch concave 53v.

In other words, when one of the upstream latch mechanism 70 and downstream latch mechanism 80 is latched, the other is unlatched.

However, in the transitional phase of latching, the upstream latch mechanism 70 and downstream latch mechanism 80 are both in the latched state temporarily.

As shown in FIGS. 8(a) and 8(c), a latch angle sensor 95 is located in a prescribed position as a limit switch for detecting the tip of the downstream latch arm 81 of the downstream latch mechanism 80 which is unlatched and swinging with its latch claw 81c getting out of the downstream latch concave 63v.

The latch angle sensor 95 also detects the engagement of the latch claw 71c of the upstream latch arm 71 with the upstream latch concave 53v of the upstream rotating member 51.

A detection signal from the latch angle sensor 95 is input to an ECU where it is used to control the slave hydraulic cylinder 8 and disengage the multi-plate friction clutch 3.

A lock pin 72 protrudes leftward from a prescribed point on the left side face of the upstream latch arm 71.

When the upstream latch arm 71 and downstream latch arm 81, which are formed integrally, are in a prescribed position on the left, the latch claw 71c of the upstream latch arm 71 and the latch claw 81c of the downstream latch arm 81 are latched in the upstream latch concave 53v of the upstream rotating member 51 and the downstream latch concave 63v of the downstream rotating member 61 respectively (as indicated by solid line in FIG. 2).

Then, as the upstream latch arm 71 and downstream latch arm 81 move rightward, the upstream latch arm 71 and downstream latch arm 81 axially leave the upstream latch concave 53v of the upstream rotating member 51 and the downstream latch concave 63v of the downstream rotating member 61 respectively and become unable to be latched in the upstream latch concave 53v of the upstream rotating member 51 and the downstream latch concave 63v of the downstream rotating member 61 (as indicated by the chain double-dashed line in FIG. 2).

The latch arm shaft 76, supporting the upstream latch arm 71 and downstream latch arm 81, penetrates the guide plate 35 and protrudes leftward and the base end portion of a leading arm 85 is rotatably and axially movably journalled to the protruding left shaft portion (see FIGS. 2 and 8(a) to (c)).

A driven pin 86 protrudes leftward from the tip of the leading arm 85 and the driven pin 86 slidably fits in the cam hole 33b of the master arm 33 which is bent into a prescribed shape.

Therefore, as the master arm 33 swings, the cam hole 33b turning at the swinging tip guides the driven pin 86 to swing the leading arm 85.

The leading arm 85 extends along the upstream latch arm 71 from the latch arm shaft 76 almost in the same direction and a lock pin 87 protruding rightward from a point on the right side face of the leading arm 85 near its base end and a lock pin 72 protruding on the left of the upstream latch arm 71 overlap in the axial direction.

A torsion coil spring 88 is wound around the coil on the periphery of the swing center base end portion 75 shared by the upstream latch arm 71 and downstream latch arm 81 and the ends of the torsion coil spring 88 extending radially from the coil are elastically squeezed and locked on the lock pin 87 of the leading arm 85 and the lock pin 72 of the upstream latch arm.

Since the lock pin 87 of the leading arm 85 and the lock pin 72 of the upstream latch arm 71 are slightly different in terms of distance from the latch arm shaft 76, they are elastically sandwiched between both ends of the torsion coil spring 88 in the same direction from the latch arm shaft 76 so that relative rotation of the leading arm 85 and upstream latch arm 71 is suppressed by the spring force of the torsion coil spring 88.

Therefore, the swing motion of the leading arm 85 is transmitted through the torsion coil spring 88 to the upstream latch arm 71 (and the downstream latch arm 81 integral with it).

An electromagnetic solenoid 91, coupled coaxially with a drive shaft 91d, is provided at the left end of the latch arm shaft 76 pivotally supporting the leading arm 85.

A compression coil spring 92 is wound around the left end portion of the latch arm shaft 76 to bias the latch arm shaft 76 rightward.

When the electromagnetic solenoid 91 is demagnetized, the compression coil spring 92 biases the latch arm shaft 76 rightward and places it in a right prescribed position and the upstream latch arm 71 and downstream latch arm 81 respectively leave the upstream latch concave 53v of the upstream rotating member 51 and the downstream latch concave 63v of the downstream rotating member 61 axially and become unable to be latched (as indicated by the chain double-dashed line in FIG. 2).

When the electromagnetic solenoid 91 is magnetized and the drive shaft 91d is pulled, the latch arm shaft 76 moves leftward together with the upstream latch arm 71 and downstream latch arm 81 against the compression coil spring 92 and becomes latchable or comes in a left prescribed position in which both the latch claws 71c and 81c can be latched in the upstream latch concave 53v of the upstream rotating member 51 and the downstream latch concave 63v of the downstream latch arm 81 (as indicated by the solid line in FIG. 2).

As described above, a latching function switching mechanism 90 is constituted in which both the latching functions of the upstream latch mechanism 70 and downstream latch mechanism 80 are disabled or enabled by controlling the electromagnetic solenoid 91.

As the upstream latch arm 71 and downstream latch arm 81 move, the torsion coil spring 88 wound around the swing center base end portion 75 moves as well.

This latching function switching mechanism 90 is controlled according as whether the vehicle is running or at a stop.

When the vehicle is running, the electromagnetic solenoid 91 is magnetized to enable the latching functions of the upstream latch mechanism 70 and downstream latch mechanism 80 to ensure smooth gear shift; and even though the downstream detent mechanism 66 has a downstream detent concave 62v corresponding to a neutral position, no upstream latch concaves 53v and downstream latch concaves 63v correspond to a neutral position and either an upstream latch concave 53v or a downstream latch concave 63v is latched, the other is unlatched, so during a run the shift drum 21 is never placed in the neutral position however the rider does gear shift operation.

When the vehicle is at a stop, since the electromagnetic solenoid 91 is demagnetized to disable the latching functions of the upstream latch mechanism 70 and downstream latch mechanism 80 and the upstream latch mechanism 70 and downstream latch mechanism 80 are not latched, the rollers 58 and 68 can be pressed in the detent concaves 52v and 62v corresponding to a neutral position in the upstream detent mechanism 56 and downstream detent mechanism 66 for positioning, so the shift drum 21 can be placed in the neutral position easily.

The gear shift device 20 is structured as mentioned above; next, the process of shifting the gear stage will be explained referring to FIGS. 8 to 13.

In the process of shifting the gear stage as described below, the latching functions of the upstream latch mechanism 70 and downstream latch mechanism 80 are enabled.

FIGS. 8(a) to (c) show that a gear stage is established, in which FIG. 8(a) is a left side view of the overall gear shift device 20, FIG. 8(b) is a left side view mainly showing the upstream rotating member 51 with some part of the gear shift device 20 omitted, FIG. 8(c) is a left side view mainly showing the downstream rotating member 61 with some further part of the gear shift device 20 omitted and FIGS. 8(a), (b) and (c) illustrate the same state.

Also in FIGS. 9 to 13, side views (a), (b) and (c) illustrate a state which changes with time, as mentioned above.

First, in FIGS. 8(a) to (c) showing that a gear stage is established, the shift pedal 30 is not pressed; the master arm 33 is in its neutral position; the latch claw 81c of the downstream latch arm 81 of the downstream latch mechanism 80 is engaged with the downstream latch concave 63v of the downstream rotating member 61 (the upstream latch mechanism 70 is unlatched); and the shift drum 21 is held in a rotational angle position for that gear stage to establish the gear stage; and the driven pin 86 at the tip of the leading arm 85 lies in the center of the center arc portion 33ba of the cam hole 33b of the master arm 33.

FIGS. 9(a) to (c) show a state in which after the establishment of this gear stage the shift pedal 30 has been pressed in one direction and the master arm 33 has been swung less than 4 degrees against the return spring 34 through the shift spindle 31.

In this example, the master arm 33 is swung counterclockwise as seen in FIGS. 9(a) to (c).

In this specification, "clockwise" (turn to the right) and "counterclockwise (turn to the left), words used to express the direction of swing or rotation, refer to directions as seen in the left side views of FIGS. 8 to 13(a) to (c).

Although the driven pin 86 at the tip of the leading arm 85 reaches an end of the center arch portion 33ba of the cam hole 33b of the master arm 33, in the meantime the center arc portion 33ba does not affect it and stays in the same position and thus the leading arm 85 does not swing.

The driven boss 38b slidably fitted in the drive hole 33c of the master arm 33c is guided to rotate the shift input member 38 and one pole 41 of the pole ratchet mechanism 40 is latched to the latching surface of an inner concave 51bh of the upstream rotating member 51, so the upstream rotating member 51 is rotated about 15 degrees counterclockwise; however, the downstream rotating member 61 connected by the lost motion spring 60 of the lost motion mechanism 50 is slightly rotated but the latch claw 81c of the downstream latch arm 81 is latched to the latching surface of a downstream latch concave 63v to limit rotation and an operation force is thus accumulated in the lost motion spring 60.

Figure 10A:
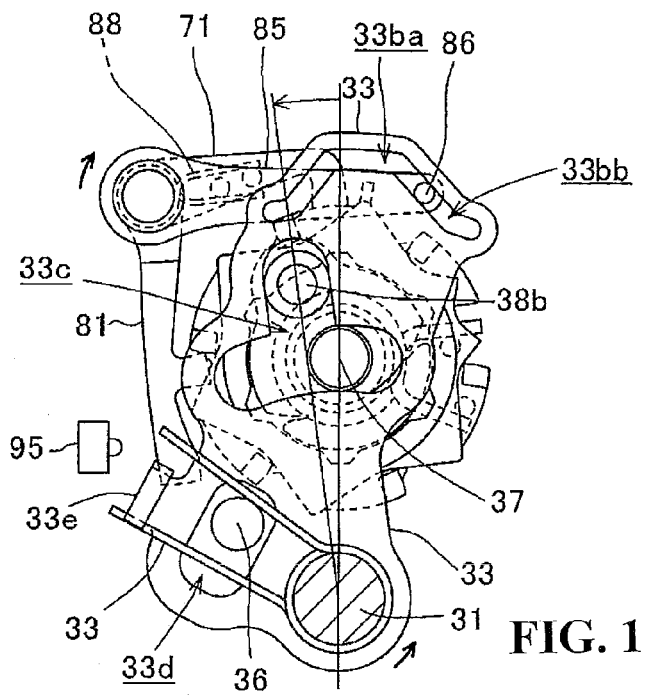
FIGS. 10(a) to (c) are side views showing key parts of the gear shift device in the next step.
Figure 10B:
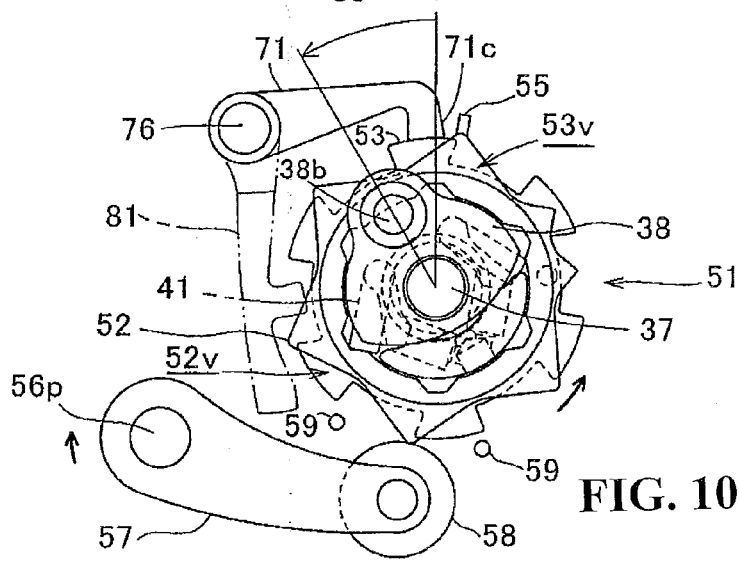
Figure 10C:
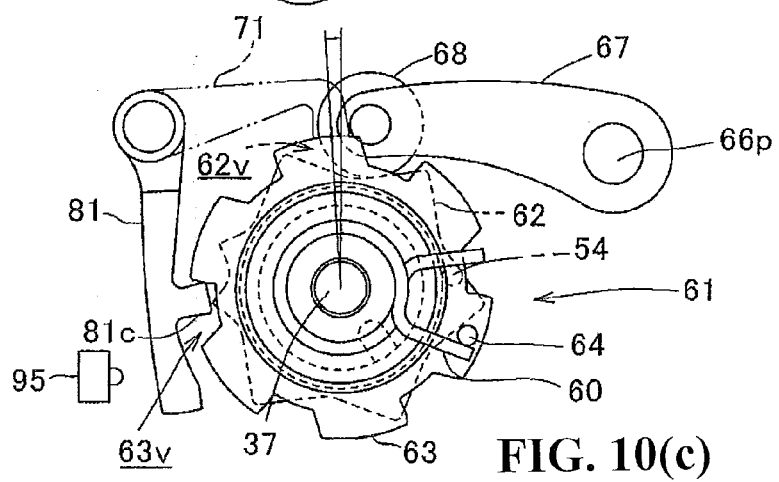

Next, FIGS. 10(a) to (c) show a state in which the master arm 33 has swung by less than 8 degrees.

Since the driven pin 86 at the tip of the leading arm 85 has moved to an oblique portion 33bb of the cam hole 33b of the master arm 33, the leading arm 85, guided in the oblique portion 33bb, swings clockwise and attempts to swing the upstream latch arm 71 in the same direction through the torsion coil spring 88; however, the swing motion of the master arm 33 rotates the upstream rotating member 51 about 30 degrees through the shift input member 38 and the latch caw 71c at the tip of the upstream latch arm 71 touches the upstream latch flange 53 and prevents the upstream latch arm 71 (and the downstream latch arm 81) from swinging (see FIG. 10(b)), thereby keeping the downstream rotating member 61 latched by the upstream latch arm 81.

Therefore, an operation force is further accumulated in the lost motion spring 60 of the lost motion mechanism 50 and an operation force is also accumulated in the torsion coil spring 88 between the leading arm 85 and upstream latch arm 71.

Figure 11A:
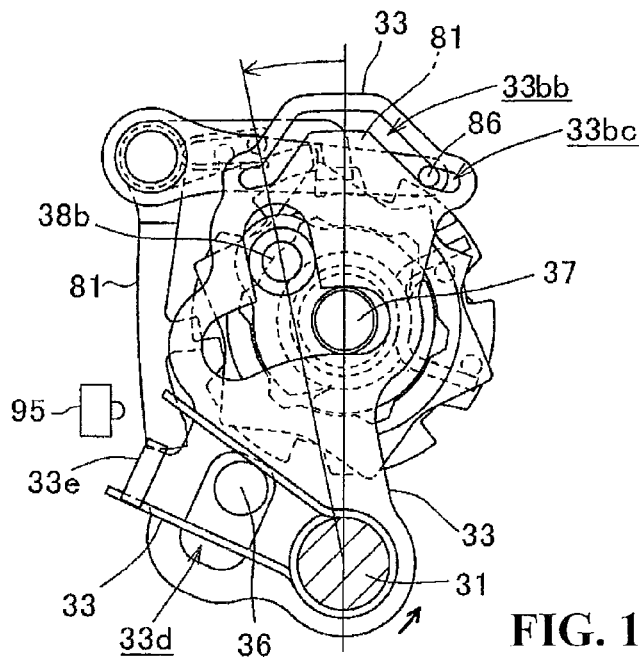
FIGS. 11(a) to (c) are side views showing key parts of the gear shift device in the next step.
Figure 11B:
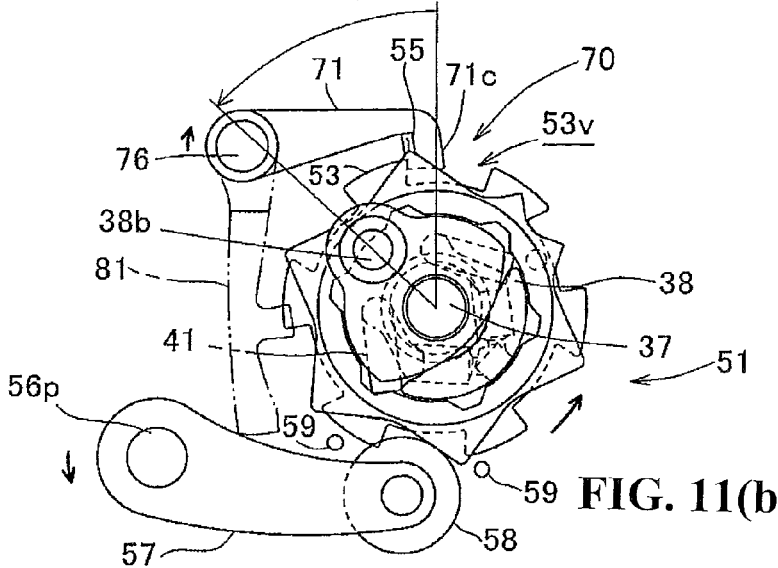
Figure 11C:
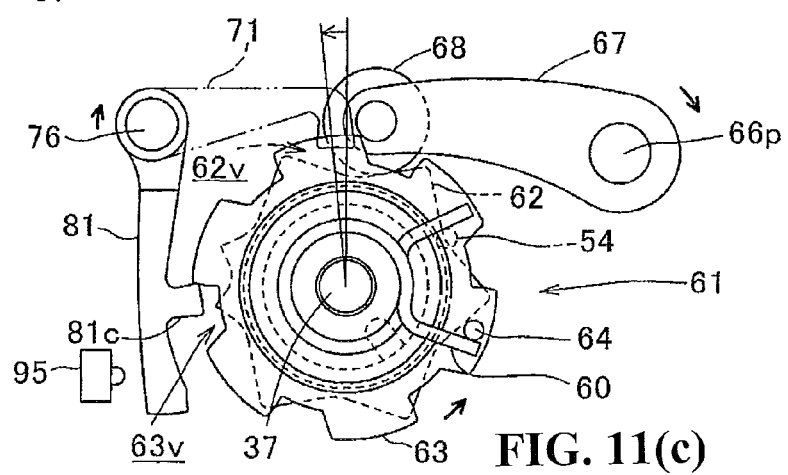

Next, FIGS. 11(a) to (c) show a state in which the master arm 33 has swung about 12 degrees.

Since the driven pin 86 at the tip of the leading arm 85 has reached the end of the oblique portion 33bb of the cam hole 33b of the master arm 33 and the force accumulated in the torsion coil spring 88 has been just maximized, the swing motion of the master arm 33 rotates the upstream rotating member 51 further about 50 degrees; the latch claw 71c at the tip of the upstream latch arm 71 faces the upstream latch concave 53v from the upstream latch flange 53 and the force accumulated in the torsion coil spring 88 causes the arm 71 to swing clockwise and latches the latch claw 71c to the latching surface of the upstream latch concave 53v, though the latch claw 81c of the downstream latch arm 81 swinging together is just about to leave the downstream latch concave 63v of the downstream rotating member 61 and not unlatched yet and the downstream rotating member 61, which is to receive the operation force accumulated in the lost motion spring 60 of the lost motion mechanism 50, does not rotate yet.

While the latch claw 81c of the downstream latch arm 81 slides in contact with the latching surface of the downstream latch concave 63v, the downstream rotating member 61 somewhat rotates.

Figure 12A:
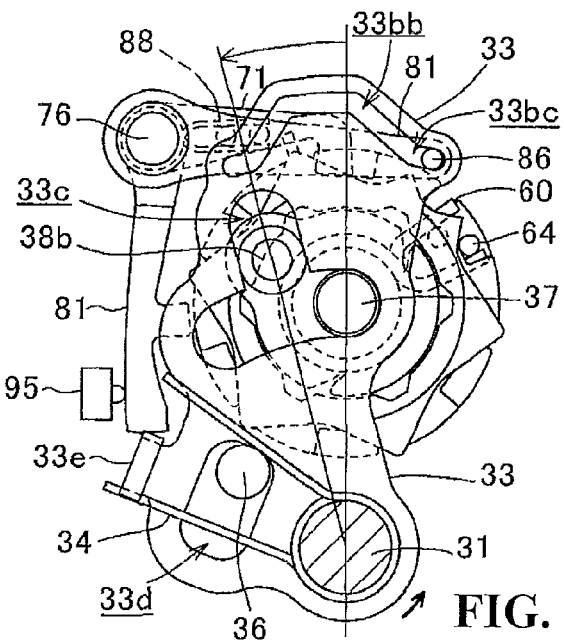
FIGS. 12(a) to (c) are side views showing key parts of the gear shift device in the next step in which gear shift is being finished.
Figure 12B:
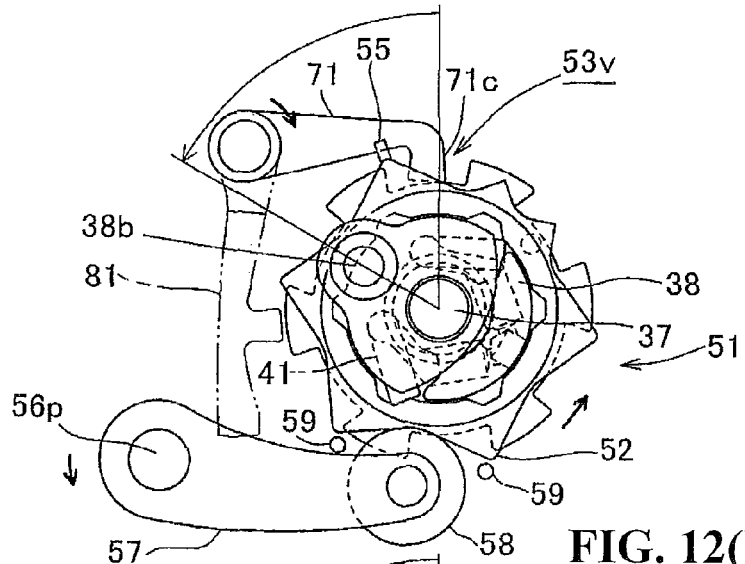
Figure 12C:
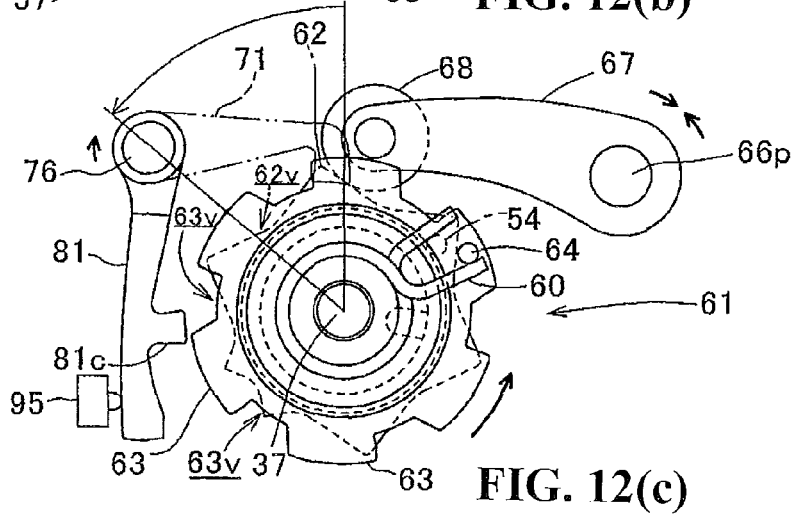

Next, FIGS. 12(a) to (c) show a state in which the shift pedal 30 has been pressed down to the limit and the master arm 33 has swung about 15 degrees, a maximum angle allowed by the regulating hole 33d.

The driven pin 86 at the tip of the leading arm 85 gets into the end arc portion 33bc of the cam hole 33b of the master arm 33 and the leading arm 85 does not swing at the maximum swing angle; and with the swing motion of the master arm 33, the upstream rotating member 51 rotates by an intermittent feed angle of 60 degrees and due to the force accumulated in the torsion coil spring 88, the upstream latch arm 71 swings and the latch claw 71c at the tip is completely engaged with the upstream latch concave 53v; and the latch claw 81c of the downstream latch arm 81 swinging together is unlatched from the downstream latch concave 63v of the downstream rotating member 61 and leaves it, so the operation force accumulated in the lost motion spring 60 of the lost motion mechanism 50 is applied to the unlatched downstream rotating member 61.

The latch angle sensor 95 detects the swing motion of the downstream latch arm 81 and according to the detection signal, the multi-plate friction clutch 3 is disengaged and the resistance produced by dog clutching in the gear transmission mechanism 10 is reduced, so the downstream rotating member 61 rotates smoothly by the operation force accumulated in the lost motion spring 60 of the lost motion mechanism 50, thus reaching a state in which the downstream rotating member 61 has rotated 60 degrees at a stroke, namely the shift drum 21, integral with the downstream rotating member 61, has rotated 60 degrees to finish the process of shifting the gear stage.

FIGS. 12(a) to (c) show a state in which the process of shifting the gear stage has been thus finished.

When the action of pressing the shift pedal 30 (gear shift operation input) is stopped at this point, the master arm 33 swings clockwise together with the shift spindle 31 and shift pedal 30 by the spring force of the return spring 34 and returns to its neutral position.

Figure 13A:
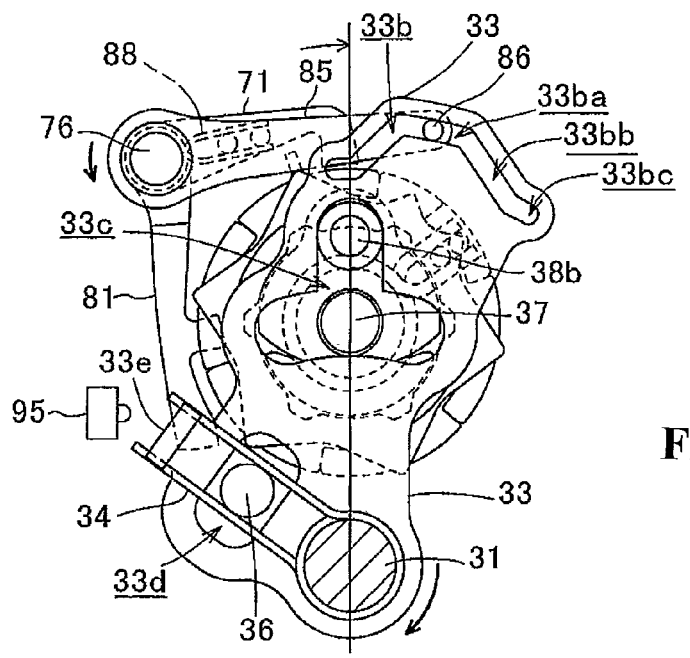
FIGS. 13(a) to (c) are side views showing key parts of the gear shift device in the next step in which gear shift is completely finished.
Figure 13B:
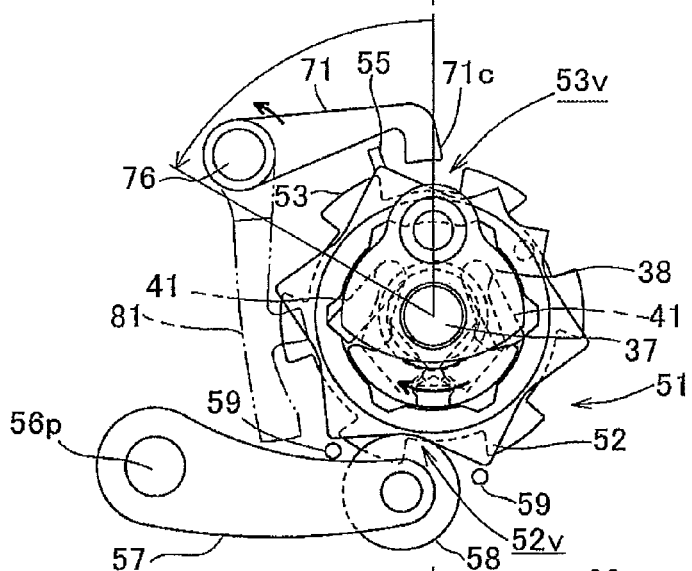
Figure 13C:
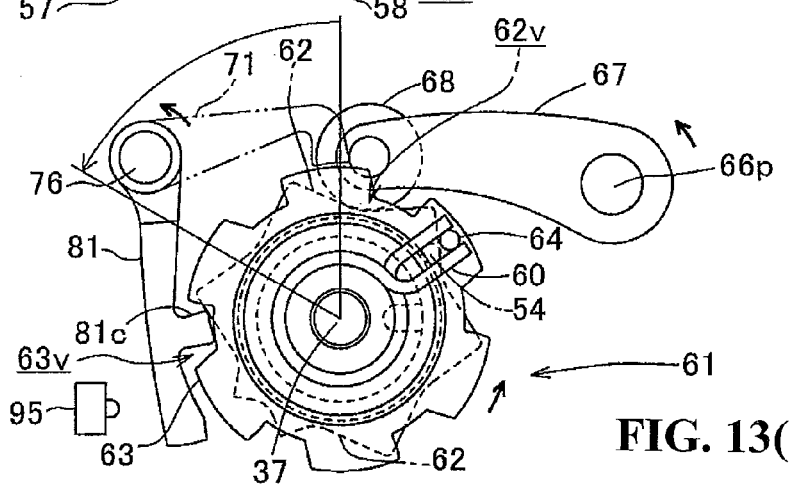

FIGS. 13(a) to (c) show such a state.

In this state, the driven boss 38b slidably fitted in the drive hole 33c of the master arm 33c is guided to rotate the shift input member 38 clockwise and in the pole ratchet mechanism 40, and with clockwise rotation of the shift input member 38, the pole 41 is not engaged with the inner concave 51bh of the upstream rotating member 51 and the upstream rotating member 51 does not rotate and remains as it was.

Also, since the master arm 33 returns to its neutral position, the driven pin 86 at the tip of the leading arm 85 returns to the center of the center arc portion 33ba of the cam hole 33b of the master arm 33; the leading arm 85 swings counterclockwise and at the same time the upstream latch arm 71 and downstream latch arm 81 swing counterclockwise together through the torsion coil spring 88; the latch claw 71c of the upstream latch arm 71 leaves the upstream latch concave 53v of the upstream rotating member 51; and the latch claw 81c of the downstream latch arm 81 engages with the downstream latch concave 63v of the downstream rotating member 61 to restrict rotation of the downstream rotating member 61 and the gear shift process is completely finished.

The above example assumes that the master arm 33 swings counterclockwise; however, even when the master arm 33 swings clockwise, the process is the same as above except that the direction of swing and the direction of rotation are reverse, and "shift up" and "shift down" are performed in the same way as above.

In the gear shift device 20, when there is a required level of gear shift operation input and the state shown in FIGS. 11(a) to (c) is attained, namely the upstream rotating member 51 rotates about 50 degrees and the latch claw 71c of the upstream latch arm 71 is latched to the latching surface of the upstream latch concave 53v, then even if the action of pressing the shift pedal 30, or input of gear shift operation, is stopped, the latch claw 71c with its width increasing from the bent part of the upstream latch arm 71 to its tip is latched to the latching surface formed at an acute angle with respect to the bottom face of the upstream latch concave 53v and hardly unlatched, so the upstream rotating member 51 is held in a rotational position and the operation force accumulated in the lost motion spring 60 is maintained; on the other hand, the latch claw 81c of the downstream latch arm 81 is latched to the latching surface at an obtuse angle with respect to the bottom face of the downstream latch concave 63v of the downstream rotating member and easily slides on the obtusely angled latching surface and leaves the downstream latch concave 63v and the downstream latch arm 81 swings clockwise and the latch angle sensor 95 detects the swing motion of the downstream latch arm 81.

Therefore, since the multi-plate friction clutch 3 is disengaged according to a detection signal from the latch angle sensor 95, the resistance produced by dog clutching in the gear transmission mechanism 10 is reduced and the downstream rotating member 61 rotates together with the shift drum 21 smoothly by the operation force accumulated in the lost motion spring 60 of the lost motion mechanism 50 to shift the gear stage.

In this way, the gear shift device 20 has the upstream latch mechanism 70 which holds in a required rotational position the upstream rotating member 51 of the lost motion mechanism 50 which is rotated through the intermittent feed mechanism 32 from the shift spindle 31 by gear shift operation input, namely press of the shift pedal 30, so when there is a required level of gear shift operation input and the upstream rotating member 51 of the lost motion mechanism 50 is held in the required rotational position, the operation force is accumulated and held in the lost motion spring 60 of the lost motion mechanism 50 and even if gear shift operation input is stopped before completion of gear shift and the shift spindle 31 is returned, the force accumulated and held in the lost motion mechanism 50 rotates the shift drum 21 without continuing gear shift operation input so that gear shift is adequately performed and operability is improved.

Thanks to the downstream latch mechanism 80, the gear shift operation force is accumulated in the lost motion spring 60 of the lost motion mechanism 50 adequately and sufficiently and the downstream latch mechanism 80 is unlatched timely, so the shift drum 21 is rotated adequately by the sufficiently accumulated force and the gear stage is shifted adequately.

In the upstream rotating member 51 of the lost motion mechanism 50, the upstream stellar cam 52 has a stopper piece 55 protruding radially between the upstream detent concaves 52v corresponding to the first and sixth speeds respectively, and two stopper pins 59 protrude from both sides of the roller 58 at the tip of the upstream detent arm 57 on the right side face of the guide plate 35 in a way to sandwich it to constitute the stopper mechanism which limits rotation of the upstream rotating member 51 to the rotation angle range corresponding to the first to sixth speeds by the stopper piece 55 touching the stopper pins 59, so when rotation of the upstream rotating member 51 is restricted, rotation of the shift input member 38 through the pole ratchet mechanism 40 in the same direction is also restricted and rotation of the master arm 33 in the same direction is also restricted, thus restraining the shift pedal 30 from being pressed in the same direction.

Therefore, even if the rider attempts to use the shift pedal 30 to shift down to less than the first speed (minimum gear stage) or up to more than the sixth speed (maximum gear stage), he/she fails to do so and can easily know that the current gear stage is the minimum gear stage or maximum gear stage.

In the gear shift device 20 of the present invention, the upstream detent mechanism 56, along with the upstream latch mechanism 70, is located upstream of the lost motion mechanism 50 and the upstream detent mechanism 56 gives a feel of a click upon gear shift operation input and makes it possible to know whether or not gear shift has been performed.

The downstream detent mechanism 66, along with the downstream latch mechanism 80, is located downstream of the lost motion mechanism 50, so a more stable amount of rotation can be given to the shift drum 21.

The upstream detent mechanism 56 and downstream detent mechanism 66 optimize the gear shift operation force accumulated in the lost motion mechanism 50 between them to set the torque of the shift drum 21 and keep the torque of the shift drum adequate.

In the upstream rotating member 51 of the lost motion mechanism 50, the upstream stellar cam 52 has a stopper piece 55 protruding radially between the upstream detent concaves 52v corresponding to the first and sixth speeds respectively, and two stopper pins 59 protrude from both sides of the roller 58 at the tip of the upstream detent arm 57 on the right side face of the guide plate 35 in a way to sandwich it to constitute the stopper mechanism which limits rotation of the upstream rotating member 51 to the rotation angle range corresponding to the first to sixth speeds by the stopper piece 55 touching the stopper pins 59, so when rotation of the upstream rotating member 51 is restricted, rotation of the shift input member 38 through the pole ratchet mechanism 40 in the same direction is also restricted and rotation of the master arm 33 in the same direction is also restricted, thus restraining the shift pedal 30 from being pressed in the same direction.

Therefore, even if the rider attempts to use the shift pedal 30 to shift down to less than the first speed (minimum gear stage) or up to more than the sixth speed (maximum gear stage), he/she fails to do so and can easily know that the current gear stage is the minimum gear stage or maximum gear stage.

In addition, the gear shift device 20 has the upstream latch mechanism 70 which holds in a required rotational position the upstream rotating member 51 of the lost motion mechanism 50 which is rotated through the intermittent feed mechanism 32 from the shift spindle 31 by gear shift operation input, namely press of the shift pedal 30, so when there is a required level of gear shift operation input and the upstream rotating member 51 of the lost motion mechanism 50 is held in the required rotational position, the operation force is accumulated and held in the lost motion spring 60 of the lost motion mechanism 50 and even if gear shift operation input is stopped before completion of gear shift and the shift spindle 31 is returned, the shift drum 21 is rotated by the force accumulated and held in the lost motion mechanism 50 without continuing gear shift operation input so that gear shift is adequately performed and operability is improved.

Thanks to the downstream latch mechanism 80, the gear shift operation force is accumulated in the lost motion spring 60 of the lost motion mechanism 50 adequately and sufficiently and the downstream latch mechanism 80 is timely unlatched synchronously with the upstream latch mechanism 70 so that the shift drum 21 is rotated by the accumulated force adequately and the gear stage is shifted adequately.

The upstream latch arm 71 and downstream latch arm 81 are swingably journalled to the common latch arm spindle 76 integrally with the common swing center base end portion 75 and the latching function switching mechanism 90 moves the common swing center base end portion axially through the electromagnetic solenoid 91 to make it impossible to latch the latch claws 71c and 81c of the upstream latch arm 71 and downstream latch arm 81 in the corresponding latch concaves, so the actuator (electromagnetic solenoid 91) of the latching function switching mechanism 90 moves the upstream latch arm 71 and downstream latch arm 81 simultaneously through a single simple structure so that both the latching functions of the upstream latch mechanism 70 and downstream latch mechanism 80 are disabled easily.

The downstream latch mechanism 80 for regulating rotation of the shift drum 21 is provided downstream of the lost motion mechanism 50 and the downstream latch mechanism 80 is unlatched in conjunction with rotation of the shift spindle 31 to rotate the shift drum 21 for gear shift and the latch angle sensor 95 detects an unlatching swing motion of the downstream latch arm 81 of the downstream latch mechanism 80 and according to the detection signal, so when there is a required level of gear shift operation input, the multi-plate friction clutch 3 is disengaged disengagement of the multi-plate friction clutch 3 is controlled at a good time when the force is accumulated in the lost motion mechanism 50 so that the gear stage is shifted smoothly.

In the gear shift device 20, the downstream latch mechanism 80 for regulating rotation of the shift drum 21 is provided downstream of the lost motion mechanism 50 and in conjunction with rotation of the shift spindle 31, the downstream latch mechanism 80 is unlatched to rotate the shift drum 21 and perform gear shift, and the latch angle sensor 95 detects the unlatching swing motion of the downstream latch arm 81 of the downstream latch mechanism 80 and based on the detection signal, the multi-plate friction clutch 3 is disengaged, so regardless of how gear shift operation is carried out, disengagement of the multi-plate friction clutch 3 is controlled timely for gear shift motion by rotation of the shift drum 21 at any time and gear shift is performed smoothly.

Furthermore, since the gear shift device 20 has the upstream latch mechanism 70 which holds in a required rotational position the upstream rotating member 51 of the lost motion mechanism 50 which is rotated through the intermittent feed mechanism 32 from the shift spindle 31 by gear shift operation input, namely press of the shift pedal 30, when there is a required level of gear shift operation input and the upstream rotating member 51 of the lost motion mechanism 50 is held in the required rotational position, the operation force is accumulated and held in the lost motion spring 60 of the lost motion mechanism 50 and even if gear shift operation input is stopped before completion of gear shift and the shift spindle 31 is returned, the force accumulated and held in the lost motion mechanism 50 rotates the shift drum 21 without continuing gear shift operation input so that gear shift is adequately performed and operability is improved.

Since the downstream latch mechanism 80 is provided, the gear shift operation force can be accumulated in the lost motion spring 60 of the lost motion mechanism 50 adequately and sufficiently and as the downstream latch mechanism 80 is unlatched timely, the sufficiently accumulated force rotates the shift drum 21 adequately to shift the gear stage adequately.

Further, the upstream latch arm 71 and downstream latch arm 81 are swingably journalled to the common latch arm spindle 76 integrally with the common swing center base end portion 75 and the latching function switching mechanism 90 moves the common swing center base end portion axially through the electromagnetic solenoid 91 to make it impossible to latch the latch claws 71c and 81c of the upstream latch arm 71 and downstream latch arm 81 in the corresponding latch concaves, so the actuator (electromagnetic solenoid 91) of the latching function switching mechanism 90 moves the upstream latch arm 71 and downstream latch arm 81 simultaneously through a single simple structure so that both the latching functions of the upstream latch mechanism 70 and downstream latch mechanism 80 are disabled easily.

The downstream latch mechanism 80 for regulating rotation of the shift drum 21 is provided downstream of the lost motion mechanism 50 and the downstream latch mechanism 80 is unlatched in conjunction with rotation of the shift spindle 31 to rotate the shift drum 21 for gear shift and the latch angle sensor 95 detects an unlatching swing motion of the downstream latch arm 81 of the downstream latch mechanism 80 and according to the detection signal, so when there is a required level of gear shift operation input, the multi-plate friction clutch 3 is disengaged disengagement of the multi-plate friction clutch 3 is controlled at a good time when the force is accumulated in the lost motion mechanism 50 so that the gear stage is shifted smoothly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gear shift device which changes speed by transmitting rotation of a shift spindle by gear shift operation input to rotation of a shift drum through an intermittent feed mechanism and a lost motion mechanism, the gear shift device comprising:
   an upstream rotation holding mechanism which holds in a required rotational position an upstream rotating member of the lost motion mechanism which is rotated by the gear shift operation input through the intermittent feed mechanism a latch mechanism for latching and regulating rotation of the shift drum which is located downstream of the lost motion mechanism;
   wherein in a downstream latch mechanism as the latch mechanism, a latch concave corresponding to each gear stage is formed on a periphery of a downstream rotating member of the lost motion mechanism and a swinging downstream latch arm latches a latch claw at its tip in the latch concave;
   in an upstream latch mechanism located upstream of the lost motion mechanism, a latch concave corresponding to each gear stage is formed on a periphery of the upstream rotating member of the lost motion mechanism and a swinging upstream latch arm latches a latch claw at its tip in the latch concave; and
   the upstream latch arm and the downstream latch arm have a swing center base end portion in common and are swingably journalled to a common latch arm shaft integrally.

2. The gear shift device according to claim 1, comprising a latching function switching mechanism in which an actuator moves the common swing center base end portion axially to disable each of the latch claws of the upstream latch arm and the downstream latch arm from being latched in the corresponding latch concave.

3. The gear shift device according to claim 1, wherein the upstream rotating member of the lost motion mechanism has a stopper mechanism which prohibits rotation to a stage lower than a minimum gear stage and rotation to a stage higher than a maximum gear stage.

4. A gear shift device which changes speed by transmitting rotation of a shift spindle by gear shift operation input to rotation of a shift drum through an intermittent feed mechanism and a lost motion mechanism, the gear shift device comprising:

an upstream rotation holding mechanism which holds in a required rotational position an upstream rotating member of the lost motion mechanism which is rotated by the gear shift operation input through the intermittent feed mechanism an upstream latch mechanism for latching and holding an upstream rotating member of the lost motion mechanism; and a downstream latch mechanism for latching a downstream rotating member of the lost motion mechanism and regulating rotation of the shift drum integral with the downstream rotating member, wherein, in conjunction with a motion of the upstream latch mechanism to latch and hold the upstream rotating member, the downstream latch mechanism unlatches the downstream rotating member to rotate the shift drum and perform gear shift; and an upstream detent mechanism is provided in which a roller is pressed against a prescribed concave-convex cam surface of an upstream stellar cam integral with the upstream rotating member, with a detent concave corresponding to each gear stage formed on the cam surface.

5. The gear shift device according to claim 4, comprising a downstream detent mechanism in which a roller is pressed against a prescribed concave-convex cam surface of a downstream stellar cam integral with the downstream rotating member, with a detent concave corresponding to each gear stage formed on the cam surface.

6. The gear shift device according to claim 4, wherein the upstream rotating member has a stopper mechanism which prohibits rotation to a stage lower than a minimum gear stage and rotation to a stage higher than a maximum gear stage.

7. The gear shift device according to claim 1, further comprising:

an upstream latch mechanism for latching and holding an upstream rotating member of the lost motion mechanism; and a downstream latch mechanism for latching a downstream rotating member of the lost motion mechanism and regulating rotation of the shift drum integral with the downstream rotating member, wherein in the upstream latch mechanism, a latch concave corresponding to each gear stage is formed on a periphery of the upstream rotating member and a latch claw at a tip of a swinging upstream latch arm is latched in the latch concave;

in the downstream latch mechanism, a latch concave corresponding to each gear stage is formed on a periphery of the downstream rotating member and a latch claw at a tip of a swinging downstream latch arm is latched in the latch concave;

the upstream latch arm and the downstream latch arm are formed integrally with a swing center base end portion in common; and in conjunction with a motion of the upstream latch arm to latch and hold the upstream rotating member in a rotational position, the downstream latch arm unlatches the downstream rotating member to rotate the shift drum and perform gear shift.

8. The gear shift device according to claim 7, comprising a latching function switching mechanism in which an actuator moves the common swing center base end portion axially to make it impossible to latch each of the latch claws of the upstream latch arm and the downstream latch arm in the corresponding latch concave.

9. The gear shift device according to claim 7, comprising a clutch for enabling or disabling transmission of power to a transmission mechanism, wherein the clutch is disengaged in conjunction with an unlatching motion of the downstream latch arm.

10. The gear shift device according to claim 1, further comprising:

a downstream latch mechanism for regulating rotation of the shift drum located downstream of the lost motion mechanism, wherein, in conjunction with rotation of the shift spindle, the downstream latch mechanism is unlatched to rotate the shift drum and perform gear shift and the clutch is disengaged in conjunction with an actuated position of the downstream latch mechanism.

11. The gear shift device according to claim 10, further comprising:

an upstream latch mechanism for latching and holding an upstream rotating member of the lost motion mechanism, wherein, in conduction with a motion of an upstream latch arm to latch and hold the upstream rotating member in a rotational position, the downstream latch mechanism is unlatched to rotate the shift drum and perform gear shift.

12. The gear shift device according to claim 10, further comprising:

an upstream latch mechanism for latching and holding an upstream rotating member of the lost motion mechanism; and a downstream latch mechanism for latching a downstream rotating member of the lost motion mechanism and regulating rotation of the shift drum integral with the downstream rotating member, wherein, in the upstream latch mechanism, a latch concave corresponding to each gear stage is formed on a periphery of the upstream rotating member and a latch claw at a tip of a swinging upstream latch arm is latched in the latch concave;

in the downstream latch mechanism, a latch concave corresponding to each gear stage is formed on a periphery of the downstream rotating member and a latch claw at a tip of a swinging downstream latch arm is latched in the latch concave;

the upstream latch arm and the downstream latch arm are formed integrally with a swing center base end portion in common; and in conjunction with a motion of the upstream latch arm to latch and hold the upstream rotating member in a rotational position, the downstream latch arm unlatches the downstream rotating member to rotate the shift drum and perform gear shift.

13. The gear shift device according to claim 12, comprising a latching function switching mechanism in which an actuator moves the common swing center base end portion axially to make it impossible to latch each of the latch claws of the upstream latch arm and the downstream latch arm in the corresponding latch concave.

14. The gear shift device according to claim 13, comprising a clutch for enabling or disabling transmission of power to a transmission mechanism, wherein the clutch is disengaged in conjunction with an unlatching motion of the downstream latch arm.

15. A gear shift device which changes speed by transmitting rotation of a shift spindle by gear shift operation input to rotation of a shift drum through an intermittent feed mechanism and a lost motion mechanism, the gear shift device comprising:
   an upstream rotation holding mechanism which holds in a required rotational position an upstream rotating member of the lost motion mechanism which is rotated by the gear shift operation input through the intermittent feed mechanism,
      wherein the device automatically engages and disengages a clutch in response to a rider's gear shift operation, the device further comprising:
      a downstream latch mechanism for regulating rotation of the shift drum located downstream of the lost motion mechanism,
   wherein, in conjunction with rotation of the shift spindle, the downstream latch mechanism is unlatched to rotate the shift drum and perform gear shift and the clutch is disengaged in conjunction with an actuated position of the downstream latch mechanism.

16. The gear shift device according to claim 15, further comprising:
   an upstream latch mechanism for latching and holding an upstream rotating member of the lost motion mechanism; and
   a downstream latch mechanism for latching a downstream rotating member of the lost motion mechanism and regulating rotation of the shift drum integral with the downstream rotating member,
   wherein, in conjunction with a motion of the upstream latch mechanism to latch and hold the upstream rotating member, the downstream latch mechanism unlatches the downstream rotating member to rotate the shift drum and perform gear shift; and
   an upstream detent mechanism is provided in which a roller is pressed against a prescribed concave-convex cam surface of an upstream stellar cam integral with the upstream rotating member, with a detent concave corresponding to each gear stage formed on the cam surface.

17. The gear shift device according to claim 15, further comprising:
   an upstream latch mechanism for latching and holding an upstream rotating member of the lost motion mechanism; and
   a downstream latch mechanism for latching a downstream rotating member of the lost motion mechanism and regulating rotation of the shift drum integral with the downstream rotating member,
   wherein in the upstream latch mechanism, a latch concave corresponding to each gear stage is formed on a periphery of the upstream rotating member and a latch claw at a tip of a swinging upstream latch arm is latched in the latch concave;
   in the downstream latch mechanism, a latch concave corresponding to each gear stage is formed on a periphery of the downstream rotating member and a latch claw at a tip of a swinging downstream latch arm is latched in the latch concave;
   the upstream latch arm and the downstream latch arm are formed integrally with a swing center base end portion in common; and
   in conjunction with a motion of the upstream latch arm to latch and hold the upstream rotating member in a rotational position, the downstream latch arm unlatches the downstream rotating member to rotate the shift drum and perform gear shift.

18. The gear shift device according to claim 15, further comprising:
   an upstream latch mechanism for latching and holding an upstream rotating member of the lost motion mechanism; and
   a downstream latch mechanism for latching a downstream rotating member of the lost motion mechanism and regulating rotation of the shift drum integral with the downstream rotating member,
   wherein, in the upstream latch mechanism, a latch concave corresponding to each gear stage is formed on a periphery of the upstream rotating member and a latch claw at a tip of a swinging upstream latch arm is latched in the latch concave;
   in the downstream latch mechanism, a latch concave corresponding to each gear stage is formed on a periphery of the downstream rotating member and a latch claw at a tip of a swinging downstream latch arm is latched in the latch concave;
   the upstream latch arm and the downstream latch arm are formed integrally with a swing center base end portion in common; and
   in conjunction with a motion of the upstream latch arm to latch and hold the upstream rotating member in a rotational position, the downstream latch arm unlatches the downstream rotating member to rotate the shift drum and perform gear shift.

* * * * *